United States Patent
Chong et al.

(10) Patent No.: US 12,452,661 B2
(45) Date of Patent: Oct. 21, 2025

(54) COMMUNICATION METHOD, DEVICE, AND SYSTEM, AND STORAGE MEDIUM

(71) Applicant: HUAWEI TECHNOLOGIES CO., LTD., Guangdong (CN)

(72) Inventors: Weiwei Chong, Shenzhen (CN); Yang Xin, Shanghai (CN); Xiaobo Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 345 days.

(21) Appl. No.: 17/707,446

(22) Filed: Mar. 29, 2022

(65) Prior Publication Data

US 2022/0225094 A1  Jul. 14, 2022

Related U.S. Application Data

(63) Continuation of application No. PCT/CN2019/109717, filed on Sep. 30, 2019.

(51) Int. Cl.
  *H04W 12/06* (2021.01)
  *H04W 12/08* (2021.01)

(52) U.S. Cl.
  CPC .......... *H04W 12/06* (2013.01); *H04W 12/08* (2013.01)

(58) Field of Classification Search
  CPC .............................. H04W 12/06; H04W 12/08
  See application file for complete search history.

(56) References Cited

U.S. PATENT DOCUMENTS

| 2016/0071196 A1* | 3/2016 | Joshi | H04L 67/53 |
| | | | 705/27.1 |
| 2018/0234431 A1* | 8/2018 | Meredith | H04L 41/28 |
| 2020/0004986 A1* | 1/2020 | Brannon | G06F 3/0482 |

(Continued)

FOREIGN PATENT DOCUMENTS

| CN | 102938757 A | 2/2013 |
| CN | 103563430 A | 2/2014 |
| CN | 109388970 A | 2/2019 |

(Continued)

OTHER PUBLICATIONS

3GPP TS 23.288 V16.1.0 (Sep. 2019), "3rd Generation Partnership Project; Technical Specification Group Services and System Aspects; Architecture enhancements for 5G System (5GS) to support network data analytics services (Release 16)," Sep. 2019, 52 pages.

(Continued)

*Primary Examiner* — Noura Zoubair
(74) *Attorney, Agent, or Firm* — Fish & Richardson P.C.

(57) ABSTRACT

In embodiments of this disclosure, a data obtaining network element obtains authorization information of the user, where the authorization information includes first indication information. The first indication information indicates whether related data of the user is allowed to be obtained. The related data of the user includes data on an access network corresponding to the user and/or data on a core network corresponding to the user. The data obtaining network element sends a first request to a data providing network element when the first indication information indicates that the user allows obtaining the related data of the user, where the first request is used to obtain the related data of the user.

20 Claims, 17 Drawing Sheets

(56) References Cited

U.S. PATENT DOCUMENTS

2020/0394332 A1* 12/2020 Jakobsson ......... G06F 16/24573

FOREIGN PATENT DOCUMENTS

| EP | 2020796 A1 | 2/2009 |
| EP | 2911424 A1 | 8/2015 |
| JP | 2015133025 A | 7/2015 |
| WO | 2008071064 A1 | 6/2008 |

OTHER PUBLICATIONS

3GPP TS 23.502 V16.2.0 (Sep. 2019), "3rd Generation Partnership Project; Technical Specification Group Services and System Aspects; Procedures for the 5G System (5GS); Stage 2 (Release 16)," Sep. 2019, 524 pages.

PCT International Search Report and Written Opinion issued in International Application No. PCT/CN2019/109717 on Jun. 29, 2020, 14 pages (with English translation).

Secretary TSG SA (Maurice Pope, MCC), "Report of TSG SA meeting #78," 3GPP TSG SA Meeting #78, Lisbon, Portugal, Dec. 20-22, 2017, 140 pages.

Extended European Search Report issued in European Application No. 19947610.2 on Aug. 25, 2022, 11 pages.

NEC, Samsung, "eNA KI-13 new solution—User consent for UE analytics," SA WG2 Meeting #129bis, S2-1811767, West Palm Beach, USA, Nov. 26-30, 2018, 2 pages.

* cited by examiner

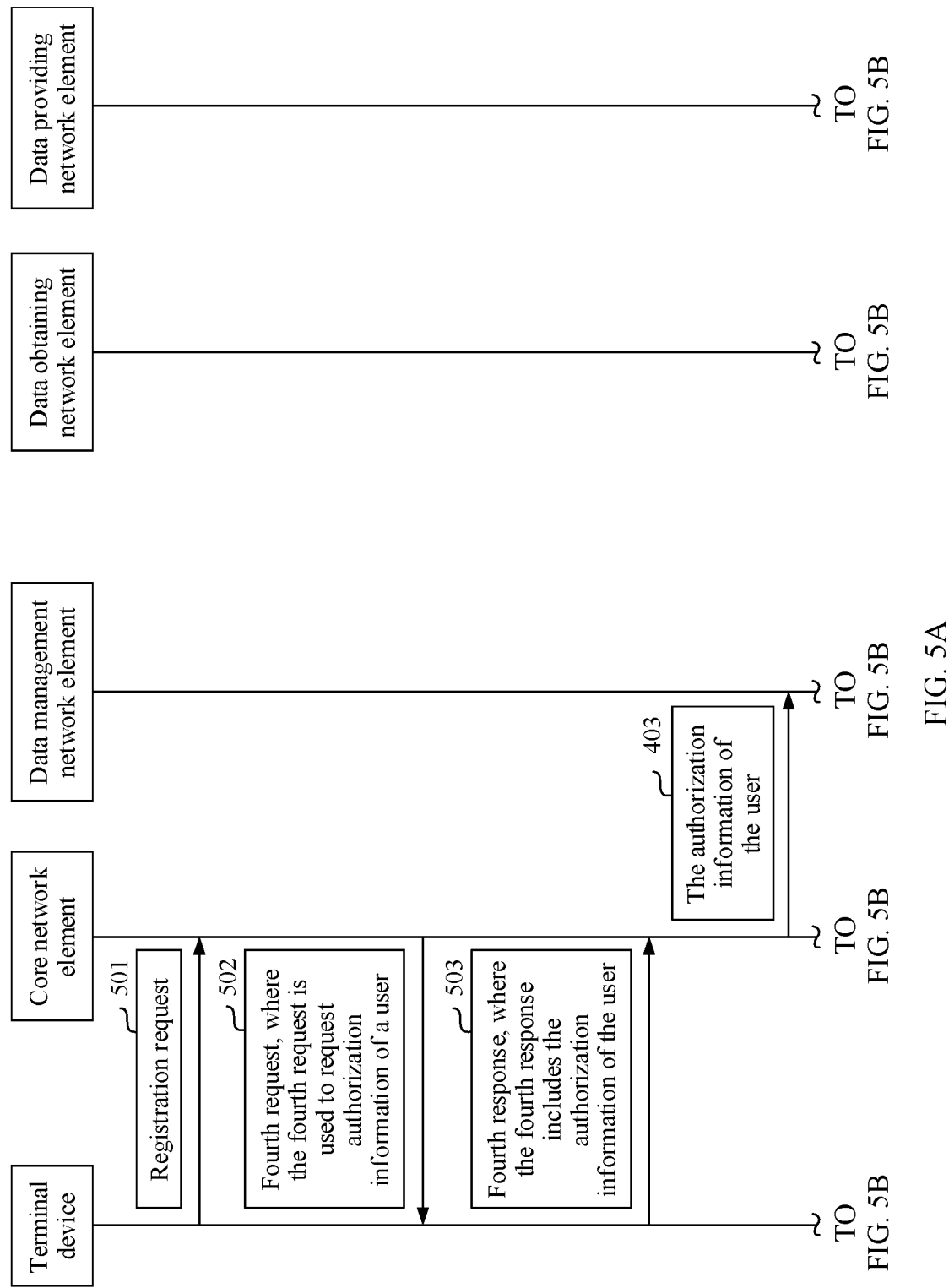

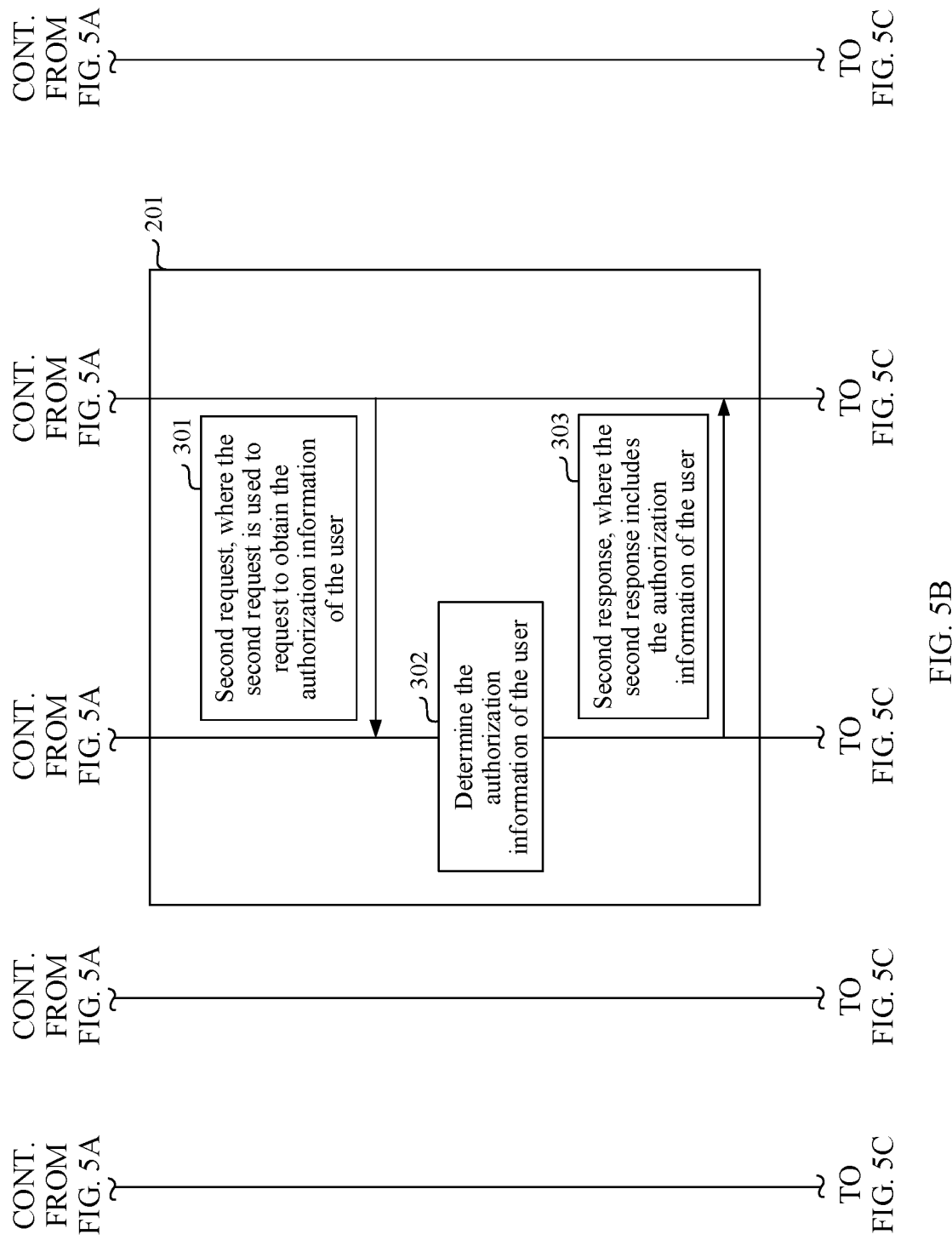

202 — The data obtaining network element sends a first request to the data providing network element when first indication information indicates that the user allows obtaining related data of the user, where the first request is used to obtain the related data of the user 203 — The data providing network element sends a first response to the data obtaining network element, where the first response includes the related data of the user 205 — Determine a data analysis result, and feed back the data analysis result to any one or more of the following objects: an access network element, a core network element, an application server, a network management network element, and a terminal device

FIG. 5C

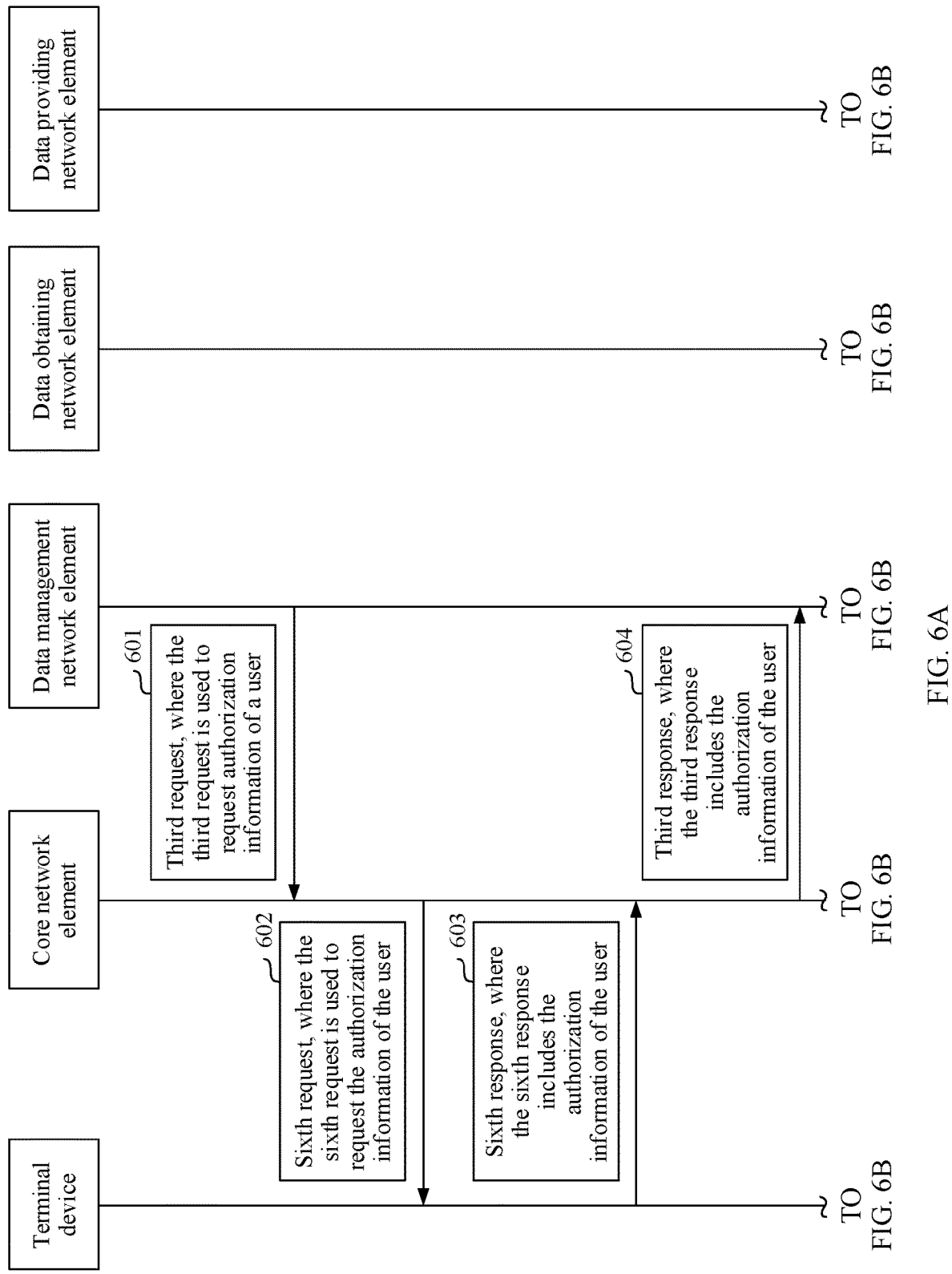

202 — The data obtaining network element sends a first request to the data providing network element when first indication information indicates that the user allows obtaining related data of the user, where the first request is used to obtain the related data of the user 203 — The data providing network element sends a first response to the data obtaining network element, where the first response includes the related data of the user 205 — Determine a data analysis result, and feed back the data analysis result to any one or more of the following objects: an access network element, a core network element, an application server, a network management network element, and a terminal device

FIG. 6C

COMMUNICATION METHOD, DEVICE, AND SYSTEM, AND STORAGE MEDIUM

CROSS-REFERENCE TO RELATED APPLICATION

This application is a continuation of International Application No. PCT/CN2019/109717, filed on Sep. 30, 2019. The disclosure of the aforementioned application is hereby incorporated by reference in its entirety.

TECHNICAL FIELD

This application relates to the communications field, and in particular, to a communication method, device, and system, and a storage medium.

BACKGROUND

The European Union General Data Protection Regulation (General Data Protection Regulation, GDPR), as the toughest personal data protection regulation in history, took effect in May 2018, and has formalized user-level data privacy and security management. The legislation stipulates that data in any user granularity generated by a user in a telecom carrier network belongs to the user, and prohibits the carrier network from obtaining and using the data randomly.

During actual application, the network needs to obtain and use the user-level data in some scenarios. For example, training and analysis may be performed based on obtained user-level data to generate an analysis result. The analysis result may be used to assist in network policy formulation and execution. However, the GDPR legislation restricts the network from obtaining and using the user-level data randomly.

SUMMARY

Embodiments of this application provide a communication method, device, and system, and a storage medium, to obtain, on a premise that the GDPR legislation is complied with, related data generated by a user in a telecom carrier network.

According to a first aspect, an embodiment of this application provides a communication method, including: A data obtaining network element obtains authorization information of a user, where the authorization information includes first indication information, the first indication information indicates whether related data of the user is allowed to be obtained, and the related data of the user includes data on an access network corresponding to the user and/or data on a core network corresponding to the user. The data obtaining network element sends a first request to a data providing network element when the first indication information indicates that the user allows obtaining the related data of the user, where the first request is used to obtain the related data of the user. The data obtaining network element receives a first response from the data providing network element, where the first response includes the related data of the user. In this way, the data obtaining network element can obtain the related data of the user when the related data of the user is allowed to be obtained. The related data generated by the user in a telecom carrier network is obtained on a premise that the GDPR legislation is complied with. On the one hand, the user-level data can be protected, and on the other hand, the data can be captured for training and analysis to assist in network policy formulation and execution.

In an optional implementation, the related data of the user further includes: data on an application server corresponding to the user and/or data on a terminal device corresponding to the user. In this way, the data on the application server corresponding to the user and the data on the terminal device corresponding to the user can be more comprehensively protected.

In an optional implementation, the authorization information further includes a limitation condition; and the limitation condition is used to limit an applicable condition of the first indication information. In an optional implementation, the limitation condition includes any one or more of the following content: time information, location information, a service type, data network name DNN information, a service identifier, a data type, and network slice information. In this way, the related data of the user can be classified in more detail from one or more dimensions, so as to separately determine whether to authorize the classified related data of the user.

In an optional implementation, the authorization information further includes second indication information; and the second indication information indicates whether the related data of the user is allowed to be used. In this way, the user can determine whether to allow the related data of the user to be used, thereby comprehensively protecting the user-level data.

In an optional implementation, that the data obtaining network element obtains the authorization information of the user includes: The data obtaining network element sends a second request to a data management network element, where the second request is used to request to obtain the authorization information of the user; and the data obtaining network element receives a second response from the data management network element, where the second response carries the authorization information of the user. In this way, the authorization information of the user can be stored on the data management network element, and can be provided for the data obtaining network element if necessary. This improves flexibility of the solution on the one hand, and on the other hand, can provide technical support for implementation of the solution for protecting the user-level data.

In an optional implementation, the second request further includes a filter condition; and the second request is used to request to obtain the authorization information of the user that meets the filter condition. The filter condition in the second request can be used by the data obtaining unit to query whether the required data is authorized to obtain, thereby improving a possibility of being authorized.

In an optional implementation, the filter condition includes any one or more of the following content: time information, location information, a service type, data network name DNN information, a service identifier, a data type, and network slice information. In this way, the obtained data can be limited from one or more dimensions, and this can obtain data that more meets expectations.

In an optional implementation, the authorization information further includes a limitation condition; the limitation condition is used to limit an applicable condition of the first indication information; and a filter condition matches the limitation condition. In this way, the first indication information that matches the data required by the data obtaining network element can be determined.

In an optional implementation, the second request includes any one or more of the following content: an identifier of an area in which the user is located, an identifier of the user, an identifier of a user group to which the user belongs, an identifier of a network slice corresponding to the user, a data network name DNN corresponding to the user, and an identifier of a network element to which the user belongs. This can improve flexibility of the solution.

In an optional implementation, the data obtaining network element obtains updated authorization information of the user; and the data obtaining network element obtains the related data of the user based on the updated authorization information of the user. In this way, the user can be allowed to change the authorization information, thereby improving flexibility of the solution.

In an optional implementation, that the updated authorization information of the user is obtained includes: The data obtaining network element obtains the updated authorization information of the user through subscription. In this manner, when the authorization information of the user changes, the data obtaining network element can obtain the changed authorization information in time.

In an optional implementation, after the data obtaining network element receives the first response from the data providing network element, the method further includes: The data obtaining network element determines a data analysis result based on the related data of the user, and feeds back the data analysis result to any one or more of the following objects: an access network element, a core network element, an application server, a network management network element, and a terminal device. After user authorization is obtained, the related data of the user is collected to assist in policy formulation on a network. On the one hand, the user-level data can be protected, and on the other hand, the data can be captured for training and analysis to assist in network policy formulation and execution.

According to a second aspect, an embodiment of this application provides a communication method, including: A data management network element receives a second request sent by a data obtaining network element, where the second request is used to request to obtain authorization information of a user. The data management network element determines the authorization information of the user, where the authorization information includes first indication information, the first indication information indicates whether related data of the user is allowed to be obtained, and the related data of the user includes data on an access network corresponding to the user and/or data on a core network corresponding to the user. The data management network element sends a second response to the data obtaining network element, where the second response includes the authorization information of the user. This improves flexibility of the solution on the one hand, and on the other hand, can provide technical support for implementation of the solution for protecting user-level data. The data obtaining network element can obtain the related data of the user when the related data of the user is allowed to be obtained. The related data generated by the user in a telecom carrier network is obtained on a premise that the GDPR legislation is complied with. On the one hand, the user-level data can be protected, and on the other hand, the data can be captured for training and analysis to assist in network policy formulation and execution.

In an optional implementation, the related data of the user further includes: data on an application server corresponding to the user and/or data on a terminal device corresponding to the user. In this way, the data on the application server corresponding to the user and the data on the terminal device corresponding to the user can be more comprehensively protected.

In an optional implementation, the authorization information further includes a limitation condition; and the limitation condition is used to limit an applicable condition of the first indication information. In an optional implementation, the limitation condition includes any one or more of the following content: time information, location information, a service type, data network name DNN information, a service identifier, a data type, and network slice information. In this way, the related data of the user can be classified in more detail from one or more dimensions, so as to separately determine whether to authorize the classified related data of the user.

In an optional implementation, the authorization information further includes second indication information; and the second indication information indicates whether the related data of the user is allowed to be used. In this way, the user can determine whether to allow the related data of the user to be used, thereby comprehensively protecting the user-level data.

In an optional implementation, the second request further includes a filter condition; and the second request is used to request to obtain the authorization information of the user that meets the filter condition. The filter condition in the second request can be used by the data obtaining unit to query whether the required data is authorized to obtain, thereby improving a possibility of being authorized.

In an optional implementation, the filter condition includes any one or more of the following content: time information, location information, a service type, data network name DNN information, a service identifier, a data type, and network slice information. In this way, the obtained data can be limited from one or more dimensions, and this can obtain data that more meets expectations.

In an optional implementation, the authorization information further includes a limitation condition; the limitation condition is used to limit an applicable condition of the first indication information; and a filter condition matches the limitation condition. In this way, the first indication information that matches the data required by the data obtaining network element can be determined.

In an optional implementation, the second request includes any one or more of the following content: an identifier of an area in which the user is located, an identifier of the user, an identifier of a user group to which the user belongs, an identifier of a network slice corresponding to the user, a data network name DNN corresponding to the user, and an identifier of a network element to which the user belongs. This can improve flexibility of the solution.

In an optional implementation, that the data management network element determines the authorization information of the user includes: The data management network element sends a third request to a core network element, where the third request is used to request the authorization information of the user. The core network element includes any one of an access and mobility management function, a session management network element, and an authentication server function network element. The data management network element receives a third response from the core network element, where the third response includes the authorization information of the user. The user can store the authorization information of the user on the data management network element in advance, or the data management network element may be temporarily triggered to obtain the authorization information of the user. This can improve flexibility of the solution.

In an optional implementation, the data management network element obtains updated authorization information of the user; and the data management network element sends the updated authorization information of the user to the data obtaining network element. In an optional implementation, before the data management network element sends the updated authorization information of the user to the data obtaining network element, the method further includes: The data management network element receives a subscription message sent by the data obtaining network element, where the subscription message is used to subscribe to a change of the authorization information of the user. In this manner, when the authorization information of the user changes, the data obtaining network element can obtain the changed authorization information in time.

According to a third aspect, an embodiment of this application provides a communication method, including: A terminal device obtains authorization information of a user, where the authorization information includes first indication information, the first indication information indicates whether related data of the user is allowed to be obtained, and the related data of the user includes data on an access network corresponding to the user and/or data on a core network corresponding to the user. The terminal device sends the authorization information of the user to a core network element. In this way, the user can set the authorization information of the user by using the terminal device, so that another network element can query, when capturing the related data of the user, whether the related data of the user is allowed to be obtained. In addition, the data obtaining network element can subsequently obtain the related data of the user when the related data of the user is allowed to be obtained. The related data generated by the user in a telecom carrier network is obtained on a premise that the GDPR legislation is complied with. On the one hand, user-level data can be protected, and on the other hand, the data can be captured for training and analysis to assist in network policy formulation and execution.

In an optional implementation, the related data of the user further includes: data on an application server corresponding to the user and/or data on a terminal device corresponding to the user. In this way, the data on the application server corresponding to the user and the data on the terminal device corresponding to the user can be more comprehensively protected.

In an optional implementation, the authorization information further includes a limitation condition; and the limitation condition is used to limit an applicable condition of the first indication information. In an optional implementation, the limitation condition includes any one or more of the following content: time information, location information, a service type, data network name DNN information, a service identifier, a data type, and network slice information. In this way, the related data of the user can be classified in more detail from one or more dimensions, so as to separately determine whether to authorize the classified related data of the user.

In an optional implementation, the authorization information further includes second indication information; and the second indication information indicates whether the related data of the user is allowed to be used. In this way, the user can determine whether to allow the related data of the user to be used, thereby comprehensively protecting the user-level data.

In an optional implementation, that the terminal device sends the authorization information of the user to the core network element includes: The terminal device sends an NAS message to the core network element, where the NAS message includes the authorization information of the user. In this way, the authorization information of the user can be carried in the NAS message in the conventional technology, and an existing method procedure in the conventional technology is reused, thereby improving compatibility of this solution.

In an optional implementation, that the terminal device sends the authorization information of the user to the core network element includes: The terminal device receives a fourth request sent by the core network element, where the fourth request is used to request the authorization information of the user. The terminal device sends a fourth response to the core network element, where the fourth response includes the authorization information of the user. In an optional implementation, before the terminal device receives the fourth request sent by the core network element, the method further includes: The terminal device sends a registration request to the core network element. This can improve flexibility of the solution.

According to a fourth aspect, an embodiment of this application provides a communication method, including: A core network element receives authorization information of a user sent by a terminal device, where the authorization information includes first indication information, the first indication information indicates whether related data of the user is allowed to be obtained, and the related data of the user includes data on an access network corresponding to the user and/or data on a core network corresponding to the user. The core network element sends the authorization information of the user to a data management network element. In this way, the authorization information of the user can be stored on the data management network element, and can be provided for the data obtaining network element if necessary. This improves flexibility of the solution on the one hand, and on the other hand, can provide technical support for implementation of the solution for protecting user-level data. In addition, the data obtaining network element can obtain the related data of the user when the related data of the user is allowed to be obtained. The related data generated by the user in a telecom carrier network is obtained on a premise that the GDPR legislation is complied with. On the one hand, the user-level data can be protected, and on the other hand, the data can be captured for training and analysis to assist in network policy formulation and execution.

In an optional implementation, the related data of the user further includes: data on an application server corresponding to the user and/or data on a terminal device corresponding to the user. In this way, the data on the application server corresponding to the user and the data on the terminal device corresponding to the user can be more comprehensively protected.

In an optional implementation, the authorization information further includes a limitation condition; and the limitation condition is used to limit an applicable condition of the first indication information. In an optional implementation, the limitation condition includes any one or more of the following content: time information, location information, a service type, data network name DNN information, a service identifier, a data type, and network slice information. In this way, the related data of the user can be classified in more detail from one or more dimensions, so as to separately determine whether to authorize the classified related data of the user.

In an optional implementation, the authorization information further includes second indication information; and the second indication information indicates whether the related data of the user is allowed to be used. In this way, the user can determine whether to allow the related data of the user to be used, thereby comprehensively protecting the user-level data.

In an optional implementation, that the core network element receives the authorization information of the user sent by the terminal device includes: The core network element receives an NAS message sent by the terminal device, where the NAS message includes the authorization information of the user. In this way, the authorization information of the user can be carried in the NAS message in the conventional technology, and an existing method procedure in the conventional technology is reused, thereby improving compatibility of this solution.

In an optional implementation, that the core network element receives the authorization information of the user sent by the terminal device includes: The core network element sends a fourth request to the terminal device, where the fourth request is used to request the authorization information of the user. The core network element receives a fourth response from the terminal device, where the fourth response includes the authorization information of the user. In an optional implementation, before the core network element sends the fourth request to the terminal device, the method further includes: The core network element receives a registration request sent by the terminal device. This can improve flexibility of the solution.

In an optional implementation, before the core network element sends the fourth request to the terminal device, the method further includes: The core network element receives a third request sent by the data management network element, where the third request is used to request the authorization information of the user. That the core network element sends the authorization information of the user to the data management network element includes: The core network element sends a third response to the data management network element, where the third response includes the authorization information of the user. The user can store the authorization information of the user on the data management network element in advance, or the data management network element may be temporarily triggered to obtain the authorization information of the user. This can improve flexibility of the solution.

In an optional implementation, the core network element receives updated authorization information of the user sent by the terminal device. The core network element sends the updated authorization information of the user to the data management network element. In this way, the user can be allowed to change the authorization information, thereby improving flexibility of the solution.

According to a fifth aspect, an embodiment of this application provides a communication method, including: A data providing network element receives a first request from a data obtaining network element, where the first request is used to obtain related data of a user. The data providing network element obtains authorization information of the user, where the authorization information includes first indication information, the first indication information indicates whether the related data of the user is allowed to be obtained, and the related data of the user includes data on an access network corresponding to the user and/or data on a core network corresponding to the user. The data providing network element sends a first response to the data obtaining network element when the first indication information indicates that the user allows obtaining the related data of the user, where the first response includes the related data of the user. In this way, the data obtaining network element can obtain the related data of the user when the related data of the user is allowed to be obtained. The related data generated by the user in a telecom carrier network is obtained on a premise that the GDPR legislation is complied with. On the one hand, user-level data can be protected, and on the other hand, the data can be captured for training and analysis to assist in network policy formulation and execution.

In an optional implementation, the related data of the user further includes: data on an application server corresponding to the user and/or data on a terminal device corresponding to the user. In this way, the data on the application server corresponding to the user and the data on the terminal device corresponding to the user can be more comprehensively protected.

In an optional implementation, the authorization information further includes a limitation condition; and the limitation condition is used to limit an applicable condition of the first indication information. In an optional implementation, the limitation condition includes any one or more of the following content: time information, location information, a service type, data network name DNN information, a service identifier, a data type, and network slice information. In this way, the related data of the user can be classified in more detail from one or more dimensions, so as to separately determine whether to authorize the classified related data of the user.

In an optional implementation, the authorization information further includes second indication information; and the second indication information indicates whether the related data of the user is allowed to be used. In this way, the user can determine whether to allow the related data of the user to be used, thereby comprehensively protecting the user-level data.

In an optional implementation, that the data providing network element obtains the authorization information of the user includes: The data providing network element sends a fifth request to a data management network element, where the fifth request is used to request to obtain the authorization information of the user. The data providing network element receives a fifth response from the data management network element, where the fifth response carries the authorization information of the user. In this way, the authorization information of the user can be stored on the data management network element, and can be provided for the data obtaining network element if necessary. This improves flexibility of the solution on the one hand, and on the other hand, can provide technical support for implementation of the solution for protecting the user-level data.

In an optional implementation, the fifth request further includes a filter condition; and the fifth request is used to request to obtain the authorization information of the user that meets the filter condition. The filter condition in the second request can be used by the data obtaining unit to query whether the required data is authorized to obtain, thereby improving a possibility of being authorized.

In an optional implementation, the filter condition includes any one or more of the following content: time information, location information, a service type, data network name DNN information, a service identifier, a data type, and network slice information. In this way, the obtained data can be limited from one or more dimensions, and this can obtain data that more meets expectations.

In an optional implementation, the authorization information further includes a limitation condition; the limitation condition is used to limit an applicable condition of the first indication information; and a filter condition matches the limitation condition. In this way, the first indication information that matches the data required by the data obtaining network element can be determined.

In an optional implementation, the fifth request includes any one or more of the following content: an identifier of an area in which the user is located, an identifier of the user, an identifier of a user group to which the user belongs, an identifier of a network slice corresponding to the user, and an identifier of a network element to which the user belongs. This can improve flexibility of the solution.

In an optional implementation, the method further includes: The data providing network element obtains updated authorization information of the user. The data providing network element provides the related data of the user based on the updated authorization information of the user. In this way, the user can be allowed to change the authorization information, thereby improving flexibility of the solution.

In an optional implementation, that the updated authorization information of the user is obtained includes: The data providing network element obtains the updated authorization information of the user through subscription. In this manner, when the authorization information of the user changes, the data obtaining network element can obtain the changed authorization information in time. Corresponding to any communication method in the first aspect to the fourteenth aspect, this application further provides a communication device. The communication device may be any device at a transmit end or device at receive end that transmits data in a wireless manner, for example, a communications chip, a terminal device, or a network device (for example, a base station). In a communication process, a device at a transmit end is relative to a device at a receive end. In some communication processes, the communication device may be used as the foregoing network device or a communications chip that may be used in the network device. In some communication processes, the communication device may be used as the foregoing terminal device or a communications chip that may be used in the terminal device.

According to a sixth aspect, a communication device is provided. The communication device includes a transceiver unit and a processing unit, to perform any implementation of any communication method in the first aspect to the fifth aspect. The transceiver unit is configured to perform functions related to sending and receiving. Optionally, the transceiver unit includes a receiving unit and a sending unit. In a design, the communication device is a communications chip, and the transceiver unit may be an input/output circuit or a port of the communications chip.

In another design, the transceiver unit may be a transmitter and a receiver, or the transceiver unit may be a transmitter and a receiver.

Optionally, the communication device further includes modules that may be configured to perform any implementation of any communication method in the first aspect to the fifth aspect.

According to a seventh aspect, a communication device is provided. The communication device is the terminal device or the network device. The network device in this embodiment of this application is a network element on a network side. For example, the data obtaining network element, the data management network element, the core network element, and the data providing network element each are a network device. The network device in this embodiment of this application may be any one or more of the data obtaining network element, the data management network element, the application server, the core network element, and the data providing network element. The communication device includes a processor and a memory. Optionally, the communication device further includes a transceiver. The memory is configured to store a computer program or an instruction. The processor is configured to invoke and run the computer program or the instruction from the memory. When the processor executes the computer program or the instruction in the memory, the communication device is enabled to perform any implementation of any communication method in the first aspect to the fifth aspect.

Optionally, there is one or more processors, and there is one or more memories.

Optionally, the memory may be integrated with the processor, or the memory and the processor are disposed separately.

Optionally, the transceiver may include a transmitter (radio transmitter) and a receiver (communicatee).

According to an eighth aspect, a communication device is provided. The communication device includes a processor. The processor is coupled to a memory, and may be configured to perform the method in any one of the first aspect to the fifth aspect, and any one of the possible implementations of the first aspect to the fifth aspect. Optionally, the communication device further includes a memory. Optionally, the communication device further includes a communications interface, and the processor is coupled to the communications interface.

In an implementation, the communication device is a terminal device. When the communication device is a terminal device, the communications interface may be a transceiver or an input/output interface. Optionally, the transceiver may be a transceiver circuit. Optionally, the input/output interface may be an input/output circuit.

In another implementation, the communication device is a network device. When the communication device is the network device, for example, any one or more of the data obtaining network element, the data management network element, the core network element, and the data providing network element, the communications interface may be a transceiver, or an input/output interface. Optionally, the transceiver may be a transceiver circuit. Optionally, the input/output interface may be an input/output circuit.

In still another implementation, the communication device is a chip or a chip system. When the communication device is a chip or a chip system, the communications interface may be an input/output interface, an interface circuit, an output circuit, an input circuit, a pin, a related circuit, or the like on the chip or the chip system. The processor may alternatively be embodied as a processing circuit or a logic circuit.

According to a ninth aspect, a system is provided. The system includes the terminal device and the network device. The network device in this embodiment of this application is a network element on a network side. For example, the data obtaining network element, the data management network element, the core network element, and the data providing network element each may be referred to as a network device. The network device in this embodiment of this application may be any one or more of the data obtaining network element, the data management network element, the application server, the core network element, and the data providing network element.

According to a tenth aspect, a computer program product is provided. The computer program product includes a computer program (which may also be referred to as code or an instruction). When the computer program is run, a computer is enabled to perform the method in any possible implementation of the first aspect, or the computer is enabled to perform the method in any implementation of the first aspect to the fifth aspect.

According to an eleventh aspect, a computer-readable storage medium is provided. The computer-readable medium stores a computer program (which may also be referred to as code or an instruction). When the computer program is run on a computer, the computer is enabled to perform the method in any possible implementation of the first aspect, or the computer is enabled to perform the method in any implementation of the first aspect to the fifth aspect.

According to a twelfth aspect, a processing device is provided. The processing device includes an input circuit, an output circuit, and a processing circuit. The processing circuit is configured to receive a signal through the input circuit, and transmit a signal through the output circuit, so that the method in any one of the first aspect to the fifth aspect and any one of the possible implementations of the first aspect to the fifth aspect is implemented.

In a specific implementation process, the processing device may be a chip, the input circuit may be an input pin, the output circuit may be an output pin, and the processing circuit may be a transistor, a gate circuit, a trigger, various logic circuits, or the like. An input signal received through the input circuit may be received and input by, for example, but not limited to, a receiver, a signal output through the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in the embodiments of this application.

BRIEF DESCRIPTION OF DRAWINGS

FIG. 5A to FIG. 5C are a schematic flowchart of another communication method according to an embodiment of this application;

FIG. 6A to FIG. 6C are a schematic flowchart of another communication method according to an embodiment of this application;

DESCRIPTION OF EMBODIMENTS

Figure 1:
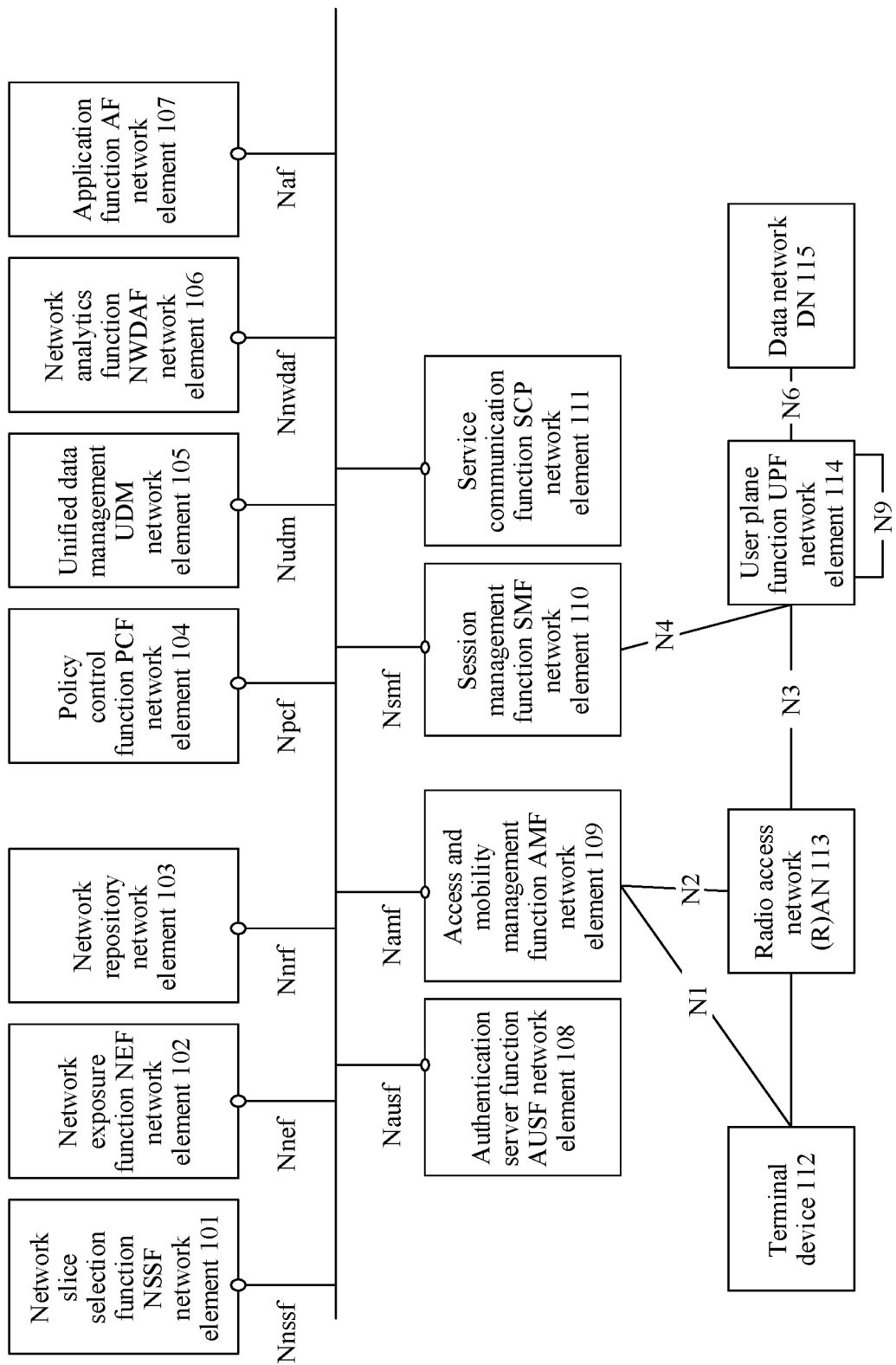
FIG. 1 is a schematic diagram of an architecture of an applicable communication system according to an embodiment of this application.

FIG. 1 shows an example of a communication system according to an embodiment of this application. Refer to FIG. 1. The communication system provided in this embodiment of this application may usually include the following devices, network elements, and networks:

1. A terminal device 112: The terminal device 112 includes but is not limited to user equipment (user equipment, UE), a subscriber unit, a subscriber station, a mobile station, a remote station, a remote terminal device, a mobile terminal device, a user terminal device, a wireless communication device, a user agent, a user device, a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device, a processing device connected to a wireless modem, a vehicle-mounted device, a wearable device, a terminal device in an internet of things, a household appliance, a virtual reality device, a terminal device in a 5G network, or a terminal device in a future evolved public land mobile network (public land mobile network, PLMN), or the like.

2. A (radio) access network (radio access network, (R)AN) element 113: The radio access network element 113 is configured to provide a network access function for authorized terminal devices in a specific area, and can use transmission tunnels with different quality based on levels, service requirements, and the like of the terminal devices.

The (R)AN element 113 can manage radio resources and provide an access service for the terminal device, to forward a control signal and data of the terminal device between the terminal device and a core network. The (R)AN element may also be understood as a base station in a conventional network.

3. A user plane network element: The user plane network element is configured to perform packet routing and forwarding, quality of service (quality of service, QoS) processing on user plane data, and the like.

As shown in FIG. 1, in a 5G communication system, the user plane network element may be a user plane function (user plane function, UPF) network element 114, and may include an intermediate user plane function (intermediate user plane function, I-UPF) network element and an anchor user plane function (anchor user plane function, A-UPF) network element. In a future communication system, the user plane network element may still be the UPF network element, or may have another name. This is not limited in this application.

4. A data network (data network, DN) 115: The data network 115 is configured to provide a network for data transmission.

As shown in FIG. 1, in a 5G communication system, the data network may be a DN 1 and a DN 2. In a future communication system, the data network may still be the DN, or may have another name. This is not limited in this application.

5. An access and mobility management network element: The access and mobility management network element is mainly configured to perform mobility management, access management, and the like. The access and mobility management network element may be configured to implement functions, for example, lawful interception and access authorization/authentication, other than session management in functions of a mobility management network element (mobility management entity, MME).

As shown in FIG. 1, in a 5G communication system, the access management network element may be an access and mobility management function (access and mobility management function, AMF) network element 109. In a future communication system, the access management network element may still be the AMF network element, or may have another name. This is not limited in this application.

6. A session management network element: The session management network element is mainly configured to manage a session, assign and manage an internet protocol (internet protocol, IP) address of a terminal device, select an endpoint that can manage a plane function, policy control and a charging function interface of the terminal device, notify downlink data, and the like.

As shown in FIG. 1, in a 5G communication system, the session management network element may be a session management function (session management function, SMF) network element 110, and may include an intermediate session management function (intermediate session management function, I-SMF) network element and an anchor session management function (anchor session management function, A-SMF) network element. In a future communication system, the session management network element may still be the SMF network element, or may have another name. This is not limited in this application.

7. A policy control network element: The policy control network element is configured to provide guidance on a unified policy framework for network behavior, provide policy rule information for a control plane function network element (such as an AMF network element or an SMF network element), and the like.

In a 4G communication system, the policy control network element may be a policy and charging rules function (policy and charging rules function, PCRF) network element. As shown in FIG. 1, in a 5G communication system, the policy control network element may be a policy control function (policy control function, PCF) network element 104. In a future communication system, the policy control network element may still be the PCF network element, or may have another name. This is not limited in this application.

8. An authentication service network element: The authentication service network element is configured to perform service authentication, generate a key to implement two-way authentication on a terminal device, and support a unified authentication framework.

As shown in FIG. 1, in a 5G communication system, the authentication service network element may be an authentication server function (authentication server function, AUSF) network element 108. In a future communication system, the authentication server function network element may still be the AUSF network element, or may have another name. This is not limited in this application.

9. A data management network element: The data management network element is configured to process an identifier of a terminal device, perform access authentication, registration, mobility management, and the like.

As shown in FIG. 1, in a 5G communication system, the data management network element may be a unified data management (unified data management, UDM) network element 105 or a unified data repository (unified data repository, UDR) network element. In a future communication system, the unified data management network element may still be the UDM network element, the UDR network element, or may have another name. This is not limited in this application.

The UDM network element or the UDR network element in this embodiment of this application may be a user database, and may be used as a single logical repository for storing user data.

10. An application network element: The application network element is configured to perform application-affected data routing, access a network exposure function network element, interact with a policy framework to perform policy control, and the like.

As shown in FIG. 1, in a 5G communication system, the application network element may be an application function (application function, AF) network element 107. In a future communication system, the application network element may still be the AF network element 107, or may have another name. This is not limited in this application.

11. A network repository network element: The network repository network element is configured to maintain real-time information of all network function services on a network.

In a 5G communication system, the network repository network element may be a network registration function (network repository function, NRF) network element 103. In a future communication system, the network repository network element may still be the NRF network element, or may have another name. This is not limited in this application.

12. A network slice selection function network element: The network slice selection function network element is configured to provide a network slice selection function.

As shown in FIG. 1, in a 5G communication system, the network slice selection function network element may be a network slice selection function (Network Slice Selection Function, NSSF) network element 101. In a future communication system, the network slice selection function network element may still be the NSSF network element, or may have another name. This is not limited in this application.

13. A network capability exposure function network element: The network capability exposure function network element is configured to provide for a customized function of network capability exposure.

As shown in FIG. 1, in a 5G communication system, the network capability exposure function network element may be a network capability exposure function (network exposure function, NEF) network element 102. In a future communication system, the network capability exposure function network element may still be the NEF network element, or may have another name. This is not limited in this application.

14. A network data analytics function network element: The network data analytics function network element is configured to provide a network slice instance-level data analytics function, for example, obtain data, perform training and analysis by using the data, and perform corresponding inference based on an analysis result.

As shown in FIG. 1, in a 5G communication system, the network analytics function network element may be a network data analytics function (network data analytics function, NWDAF) network element 106. In a future communication system, the network analytics function network element may still be the NWDAF network element, or may have another name. This is not limited in this application.

15. A service communication function network element: The service communication function network element is configured to provide a function of selective communication between NFs.

As shown in FIG. 1, in a 5G communication system, the service communication function network element may be a service communication proxy (service communication proxy, SCP) network element 111. In a future communication system, the service communication function network element may still be the SCP network element, or may have another name. This is not limited in this application.

It may be understood that the network elements or the functions may be network elements in a hardware device, software functions running on dedicated hardware, or virtualized functions instantiated on a platform (for example, a cloud platform). One or more services may be obtained through division into the network elements or the functions. Further, services that exist independently of network functions may occur. In this application, instances of the functions, instances of services included in the functions, or instances of services that exist independently of network functions may be referred to as service instances.

Further, the AF network element may be referred to as an AF for short, the NRF network element may be referred to as an NRF for short, and the PCF network element may be referred to as a PCF for short. In other words, the AF described later in this application may be replaced with the application network element, the NRF may be replaced with the network repository network element, and the PCF may be replaced with the policy control network element.

It should be noted that the embodiments of this application are not limited to the foregoing system architecture, and may be further applied to another future communication system, for example, a 6th generation communication (the 6th generation, 6G) system architecture. In addition, in the embodiments of this application, names of the foregoing used network elements may be changed while functions of the network elements may remain the same in a future communication system.

A data obtaining network element in the embodiments of this application may be used as a data requester, and may request to obtain related data of a user. The data obtaining network element in the embodiments of this application may be an NWDAF network element, or may be another network element that needs to obtain the related data of the user. The data obtaining network element may obtain the data, perform training and analysis by using the data, and perform corresponding inference based on an analysis result. The data obtaining network element determines the data analysis result based on the related data of the user, and feeds back the data analysis result to any one or more of the following objects: an access network element, a core network element, an application server, a network management network element, and a terminal device. The data analysis result is used to perform any one or more of the following operations: formulation of a mobility management policy, formulation of a charging and control policy, formulation of a session management policy, and formulation of a user plane selection policy.

For example, the data obtaining network element may obtain data from a network element, a third-party server, a terminal device, or a network management system, perform training and analysis by using the data, and provide a data analysis result for the network element, the third-party service server, the terminal device, or the network management system. The analysis result may be used to assist a network in selecting a quality of service parameter of a service, assist a network in performing traffic routing, or assist a network in selecting a background traffic transmission policy, or the like. The network element may be, for example, an NF, the third-party server may be, for example, an AF, and the network management system may be, for example, operation, administration, and maintenance (operation, administration, and maintenance, OAM). The data obtaining network element generates a service experience analysis result based on network data of the user and data of an application server corresponding to the user. The service experience analysis result may be used to assist a PCF network element in formulating a policy control and charging (Policy Control and Charging, PCC) and quality of service (Quality of Service, QoS) policy related to a service of a terminal device.

A data providing network element in the embodiments of this application may be used as a data provider, and is configured to provide the related data of the user. The data providing network element may be a network function (Network Function, NF) network element, or may be another network element, for example, an application function (application function, AF) device, a terminal device, or an OAM device. The NF network element is usually a node or a physical device in a network, may provide corresponding function support for a terminal device to access a network, perform a session, perform authentication, perform policy control, and the like, and may also generate corresponding network data. The network data may be stored on the NF, or may be stored on the OAM. For example, the AMF network element 109, the SMF network element 110, and the UDM network element 105 each are an instance of the NF network element.

A data management network element in the embodiments of this application may be a UDM network element, or may be another network element, for example, a network element that has a repository function and stores authorization information of the user. For another example, the data management network element may be a UDR network element, an AF device, or an SMSF network element.

A core network element in the embodiments of this application may include any one of an access and mobility management network element, a session management network element, and an authentication service function network element. The core network element may also include another network element located in a core network.

A network device in the embodiments of this application is a network element on a network side. For example, a data obtaining network element, a data management network element, an application server, a core network element, and a data providing network element each may be referred to as a network device. The network device in the embodiments of this application may be any one or more of the data obtaining network element, the data management network element, the application server, the core network element, and the data providing network element.

The term "and/or" in this application describes only an association relationship for describing associated objects and indicates that three relationships may exist. For example, A and/or B may indicate the following three cases: Only A exists, both A and B exist, and only B exists. In addition, the character "l" in this specification generally indicates an "or" relationship between the associated objects.

The user in the embodiments of this application may be a person or an object that uses a terminal device to perform a communication service in a network. In addition, the user may alternatively be a terminal device, for example, a terminal device in internet of things. An identifier of the user in the embodiments of this application may be an international mobile subscriber identity (International Mobile Subscriber Identity, IMSI), a subscription permanent identifier (subscription permanent identifier, SUPI), a generic public subscription identifier (generic public subscription identifier, GPSI), a user equipment internet protocol (Internet Protocol, IP) filter (UE IP filter), a mobile subscriber ISDN number (mobile subscriber ISDN number, MSISDN), an international mobile equipment identity (International Mobile Equipment Identity, IMEI), or the like. The related data of the user is user-level data protected by the GDPR. In the embodiments of this application, the related data of the user may include any one or more of the following types: a first type of related data of the user, a second type of related data of the user, and a third type of related data of the user.

The first type of related data of the user may include data on a terminal device corresponding to the user, and includes one or more types of the following data: data generated by the user on the terminal device used by the user, data of the terminal device used by the user, and data generated by the terminal device for the user. The data generated by the user on the terminal device may be, for example, global positioning system (Global Positioning System, GPS) information on the terminal device, and a user input habit on the terminal device. The data of the terminal device used by the user may be, for example, a type approval code (type approval code, TAC), a memory capacity, and a CPU model of the terminal device. The data generated by the terminal device for the user may be, for example, a port number allocated by the terminal device to the user, or storage space allocated to the user.

The second type of related data of the user may include network data of the user. In the embodiments of this application, the network data of the user includes one or more types of the following data: data generated by the user on an access network and/or a core network, data of the access network and/or the core network corresponding to the user, and data generated by the access network and/or the core network for the user. The data generated by the user on the access network and/or the core network may be, for example, location information (for example, an identifier of a cell or an identifier of a TA) of the user, or information about a network slice that the user requests to access. The data of the access network and/or the core network corresponding to the user may be, for example, a capacity of a cell in the access network, load information of an AMF, or bandwidth information of a UPF. The data generated by the access network and/or the core network for the user may be, for example, bandwidth allocated by the access network to a service of the user, information about a slice selected by the core network AMF for the user, or information about a QoS policy customized by a PCF for a service of the user. Specifically, in the embodiments of this application, the network data of the user includes data on an access network corresponding to the user. Alternatively, in the embodiments of this application, the network data of the user includes data on a core network corresponding to the user. Alternatively, in the embodiments of this application, the network data of the user includes data on an access network corresponding to the user and data on a core network corresponding to the user. The access network may also be described as an access network of a telecom carrier network, and the core network may also be described as a core network of a telecom carrier network.

The third type of related data of the user may include data on an application server corresponding to the user, or may be described as data at an application layer corresponding to the user. In the embodiments of this application, the data at the application layer corresponding to the user includes one or more types of the following data: data generated by the user in an application server, data of the application server corresponding to the user, and data generated by the application server for the user. The data generated by the user in the application server may be, for example, a type of a service used by the user, or information of an IP 5-tuple corresponding to the service of the user. The data of the application server corresponding to the user may be a type of a service that can be provided by the application server, an IP address and a port number corresponding to each type of a service, a basic function of each service, storage space of the application server, or the like. The data generated by the application server for the user may be, for example, information about an identifier of an application layer allocated by the service server to the user, a requirement of the service allocated to the service of the user, or quality information of the service of the user.

The authorization information of the user in the embodiments of this application may include first indication information. The first indication information may indicate whether the user allows obtaining the related data of the user. Specifically, there may be a plurality of options. For example, the first indication information may indicate any one of "allowed", "disallowed", and "unknown". If the first indication information indicates "allowed", the first indication information indicates that the related data of the user is allowed to be obtained. If the first indication information indicates "disallowed", the first indication information indicates that the related data of the user is disallowed to be obtained. If the first indication information indicates "unknown", the first indication information indicates that an attitude of the user about whether to allow obtaining the related data of the user is unclear, that is, whether the user allows obtaining the related data of the user is not determined currently. With reference to the plurality of types of the related data of the user, the first indication information in the embodiments of this application may indicate any one or more of whether the data on the terminal device corresponding to the user is allowed to be obtained, whether the network data of the user is allowed to be obtained, and whether the data on the application server corresponding to the user is allowed to be obtained. For example, the first indication information indicates that the data on the terminal device corresponding to the user is allowed to be obtained. For another example, the first indication information indicates that the data on the terminal device corresponding to the user is allowed to be obtained, but the network data of the user is disallowed to be obtained. For still another example, the first indication information indicates that the data on the terminal device corresponding to the user is allowed to be obtained, the network data of the user is allowed to be obtained, but the data on the application server corresponding to the user is disallowed to be obtained.

The authorization information of the user in the embodiments of this application may include second indication information. The second indication information may further indicate whether the user allows using the related data of the user. Specifically, there may be a plurality of options. For example, the second indication information may indicate any one of "allowed", "disallowed", and "unknown". If the second indication information indicates "allowed", the first indication information indicates that the related data of the user is allowed to be used. If the second indication information indicates "disallowed", the first indication information indicates that the related data of the user is disallowed to be used. If the second indication information indicates "unknown", the first indication information indicates that an attitude of the user about whether to allow using the related data of the user is unclear, that is, whether the user allows using the related data of the user is not determined currently. In this case, it may be understood that the user does not give authorization, that is, the user does not allow using the related data of the user. With reference to the plurality of types of the related data of the user, the second indication information in the embodiments of this application may indicate any one or more of whether the data on the terminal device corresponding to the user is allowed to be used, whether the network data of the user is allowed to be used, and whether the data on the application server corresponding to the user is allowed to be used. For example, the second indication information indicates that the data on the terminal device corresponding to the user is allowed to be used. For another example, the second indication information indicates that the data on the terminal device corresponding to the user is allowed to be used, but the network data of the user is disallowed to be used. For still another example, the second indication information indicates that the data on the terminal device corresponding to the user is allowed to be used, the network data of the user is allowed to be used, but the data on the application server corresponding to the user is disallowed to be used.

In the embodiments of this application, whether the user allows obtaining the related data of the user and whether the user allows using the related data of the user may be two pieces of content independent of each other, and may be separately indicated. In other words, the first indication information and the second indication information are two different pieces of information. For example, the authorization information of the user may indicate that the user allows obtaining the related data of the user, but disallows using the related data of the user. Alternatively, the authorization information of the user may indicate that the user allows obtaining the related data of the user and allows using the related data of the user. Alternatively, the authorization information of the user may indicate that the user disallows obtaining the related data of the user, but disallows using the related data of the user. For another example, the authorization information of the user may indicate that the user allows obtaining the data generated by the user on the terminal device, allows obtaining the network data of the user, allows using the data generated by the user on the terminal device, but disallows using the network data of the user.

In the embodiments of this application, the first indication information and the second indication information may also be same information. For example, the authorization information of the user only indicates whether the related data of the user is allowed to be obtained. If the related data of the user is allowed to be obtained, the related data of the user is allowed by default to be used. If the related data of the user is disallowed to be obtained, the related data of the user is disallowed by default to be used.

The authorization information of the user in the embodiments of this application may further include a limitation condition. The limitation condition may be used to limit the first indication information. In other words, the limitation condition is used to describe an applicable condition of the first indication information. The limitation condition may be used to limit the second indication information. In other words, the limitation condition is used to describe an applicable condition of the second indication information. A granularity of the authorization information of the user may be a granularity of an overall network, or may be a more subdivided granularity. In other words, the authorization information of the user may be subdivided from a plurality of dimensions. Content included in the limitation condition is a dimension used to limit the authorization information of the user. The limitation condition includes any one or more of the following content: time information, location information, a service type, a data network name (data network name, DNN) information, a service identifier, a data type, and network slice information. The network slice information may be network slice identifier information, for example, network slice selection assistance information (Network Slice Selection Assistance Information, NSSAI), single network slice selection assistance information (single Network Slice Selection Assistance Information, S-NSSAI), a network slice instance (network slice instance, NSI) identifier, or a network slice subnet instance (Network Slice Subnet Instance, NSSI) identifier. A data type in the embodiments of this application may also be referred to as an event identifier, and mainly used to indicate whether a specific type of data or a specific data structure (for example, location information of UE, or track information of UE (location information of UE corresponding to a time point)) is allowed to be obtained, and is allowed to be used. The limitation condition may be further described as any one or more of time information, location information, a service type, data network name (data network name, DNN) information, a service identifier, a data type, and network slice information used to limit the authorization information of the user. The limitation condition may alternatively be described as the authorization information of the user corresponding to the limitation condition. For example, if the limitation condition includes location information, the limitation condition may be described as user authorization information corresponding to the location information, or location information to which the authorization information of the user is applicable. For example, if the limitation condition is a preset time period and a preset location range, the first indication information indicates whether related data of the user within the preset time period and the preset location range is allowed to be obtained, and the second indication information indicates whether the related data of the user within the preset time period and the preset location range is allowed to be used. For example, if the limitation condition is a data type, the first indication information indicates whether data of a data type (for example, a network location of the user) corresponding to the user is allowed to be obtained, and the second indication information indicates whether the data of the data type (for example, the network location of the user) corresponding to the user is allowed to be used. For example, if the limitation condition is a service identifier, the first indication information indicates whether related data of the user corresponding to the service identifier is allowed to be obtained, and the second indication information indicates whether the related data of the user corresponding to the service identifier is allowed to be used.

Table 1 shows an example of a possible form of a structure of authorization information of a user. Descriptions are provided by using examples of a first row and a second row in Table 1. As shown in the first row in Table 1, related data of the user includes network data of the user. An identifier of the user is an "ID 1". A limitation condition in the authorization information of the user includes location information, time information, and a service type, where the location information is an "area 1", the time information is a "time 1", the service type is a "data service". First indication information indicates "allowed", and the second indication information indicates "disallowed". The first row in Table 1 indicates that, when the location information is the area 1 and the time information is the time 1, the network data corresponding to the data service of the user with the ID 1 is allowed to be obtained, but is disallowed to be used. As shown in the first row in Table 1, the authorization information of the user may be described as authorization information of the user corresponding to the data service within a range of the area 1 and the time 1. In the first row in Table 1, The network data of the user corresponding to the data service within the range of the area 1 and the time 1 is allowed to be obtained, but is disallowed to be used. As shown in the second row in Table 1, related data of the user includes data at an application layer corresponding to the user. An identifier of the user is an "ID 1". A limitation condition in the authorization information of the user includes location information, time information, and a service type, where the location information is an "area 2", the time information is a "time 1", the service type is a "data service". First indication information indicates "disallowed", and the second indication information indicates "disallowed". The second row in Table 1 indicates that, when the location information is the area 2 and the time information is the time 1, the data at the application server corresponding to the data service of the user with the ID 1 is disallowed to be obtained and used.

Table 1: Form of a structure of authorization information of a user

TABLE 1

Form of a structure of authorization information of a user

| Identifier of a user | Related data of the user | Limitation condition | | | First indication information | Second indication information |
| --- | --- | --- | --- | --- | --- | --- |
| | | Location information | Time information | Service type | | |
| ID 1 | Network data of the user | Area 1 | Time 1 | Data service | Allowed | Disallowed |
| | Data at an application server corresponding to the user | Area 2 | Time 1 | Data service | Disallowed | Disallowed |
| | Data on a terminal device corresponding to the user | Area 3 | Time 1 | Voice service | Unknown | Unknown |
| | Network data of the user | Area 1 | Time 2 | Voice service | Allowed | Allowed |
| | Data at an application server corresponding to the user | Area 2 | Time 2 | Voice service | Disallowed | Disallowed |
| | Data on a terminal device corresponding to the user | Area 3 | Time 2 | Voice service | Allowed | Unknown |
| | Network data of the user | Area 1 | Time 3 | Video service | Allowed | Allowed |
| | Data at an application server corresponding to the user | Area 2 | Time 3 | Video service | Disallowed | Disallowed |
| | Data on a terminal device corresponding to the user | Area 3 | Time 3 | Video service | Allowed | Unknown |

It should be noted that Table 1 is merely an example. During actual application, the limitation condition may further include another item in addition to the several items listed in Table 1. Details are not described herein. In addition, representation forms of the location information in Table 1 are not limited. For example, the location information may be represented as a public land mobile network (public land mobile network, PLMN) list/PLMN, a tracking area (tracking area, TA) list/TA, and a cell (cell) list/cell, and geographic areas (a commercial district, an administrative area, and the like). Representation forms of the time information are not limited, and the time information may be represented as content, such as a month, a day, a minute, several workdays, all workdays, and non-workdays. Forms of the service type are not limited, and the service type may be a data service type, a non-data service type, a voice service, a video service, or a game service, or may be distinguished based on a specific service identifier (for example, a service ID or an app ID).

In an optional implementation, the limitation condition may further include a roaming network of the user, and an identifier of the roaming network may be represented by a visited public land mobile network (Visited Public Land Mobile Network, VPLMN). Table 2 shows an example of a possible form of a structure of authorization information of a user. Descriptions are provided by using an example of a first row in Table 2. As shown in the first row in Table 1, related data of the user includes network data of the user. An identifier of the user is an "ID 1". A limitation condition in the authorization information of the user includes an identifier of a roaming network, and the identifier of the roaming network is a "VPLMN 1". First indication information is "allowed", and second indication information is "disallowed". The first row in Table 2 indicates that, the data on a core network and/or an access network in the roaming network VPLMN 1 corresponding to the user with the ID 1 can be allowed to be obtained, and is disallowed to be used.

Table 2: Form of a structure of authorization information of a user

TABLE 2

Form of a structure of authorization information of a user

| Identifier of a user | Related data of a user | Identifier of a roaming network | First indication information | Second indication information |
|---|---|---|---|---|
| ID 1 | Network data of the user | VPLMN 1 | Allowed | Disallowed |
| | Data at an application server corresponding to the user | VPLMN 1 | Disallowed | Disallowed |
| | Data on a terminal device corresponding to the user | VPLMN 1 | Unknown | Unknown |
| | Network data of the user | VPLMN 2 | Allowed | Allowed |
| | Data at an application server corresponding to the user | VPLMN 2 | Disallowed | Disallowed |
| | Data on a terminal device corresponding to the user | VPLMN 2 | Allowed | Unknown |
| | Network data of the user | VPLMN 3 | Allowed | Allowed |
| | Data at an application server corresponding to the user | VPLMN 3 | Disallowed | Disallowed |
| | Data on a terminal device corresponding to the user | VPLMN 3 | Allowed | Unknown |

In the embodiments of this application, if the authorization information of the user is classified based on the limitation condition such as the location information, the time information, the service type, the service identifier, the DNN, the data type, and the network slice information, the user can report authorization information corresponding to all areas, all times, all service types, all service identifiers, all DNNs, all data types, and all slices at a time in the foregoing implementation. Alternatively, the user reports authorization information corresponding to different areas, different times, different service types, different DNNs, different data types, and different slices in batches.

For example, descriptions are provided by using an example of a limitation condition with location information. When determining to enter an area (for example, a cell or a TA), a terminal device may report authorization information of a user corresponding to the area, and temporarily suspend reporting authorization information of a user that does not enter the area. In addition, if a state of the authorization information of the user changes in the area, the terminal device should also report updated authorization information of the user corresponding to the area again. It should be noted that, optionally, when the terminal device enters the area, if the terminal device is still in an idle mode, the terminal device temporarily suspends reporting the authorization information of the user of the terminal device, but waits for the terminal device to enter a connected mode due to a service requirement, and then the terminal device sends the authorization information of the user and other NAS information to a core network element on a network side, such as an AMF, an SMF, or an AUSF, through a related NAS signaling tunnel. An objective of this operation is to reduce overheads of the terminal device and the network as much as possible that are caused when the terminal device sends the information. In addition, if the authorization information of the user changes in the area, and the terminal device is in an idle mode, in an implementation, the terminal device temporarily suspends reporting the authorization information of the user, but waits for the terminal device to enter a connected mode due to a service requirement, and then the terminal device sends the authorization information of the user to a core network element on a network side through a related NAS signaling tunnel. In another implementation, the terminal device sends a service request (service request) to a network side, so as to enter a connected mode. The terminal device includes updated authorization information of the user in a service request message, or the terminal device resends another NAS message (for example, an authorization information update message) after entering the connected mode, where the another NAS message carries the updated authorization information of the user.

An example of the limitation condition of another dimension is similar to the limitation condition of the area dimension. For example, the terminal device reports authorization information of a user of the terminal device corresponding to a time period only when the terminal device enters the time period, or the terminal device reports authorization information of a user corresponding to a service only when initiating the service. Content is similar to the foregoing content, and details are not described again.

Figure 2:
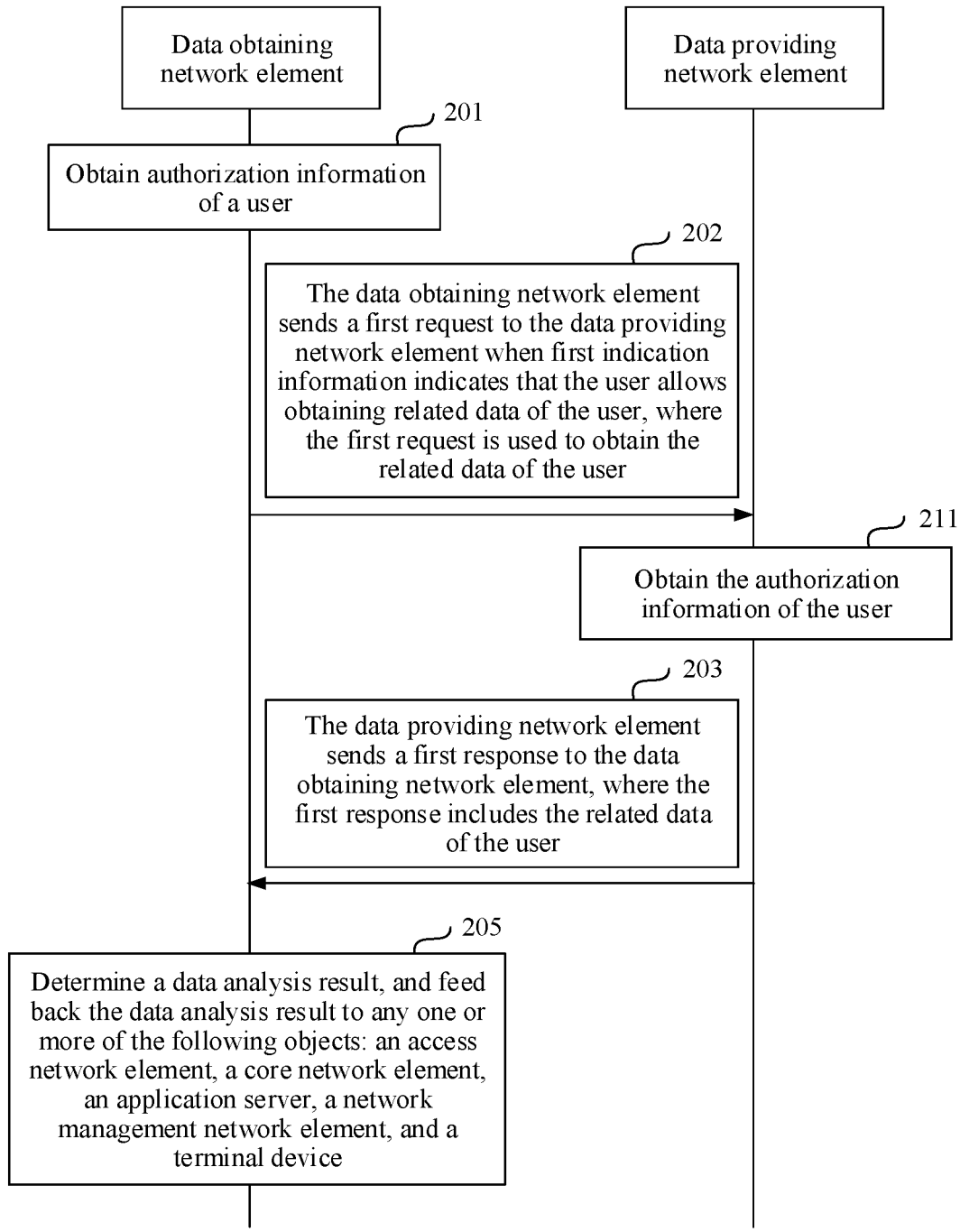
FIG. 2 is a schematic flowchart of a communication method according to an embodiment of this application.

Based on the foregoing content, FIG. 2 is a schematic flowchart of an example of a communication method according to an embodiment of this application. As shown in FIG. 2, the method includes the following steps:

Step 201: A data obtaining network element obtains authorization information of a user.

The authorization information includes first indication information. The first indication information indicates whether related data of the user is allowed to be obtained. The related data of the user includes data on an access network corresponding to the user and/or data on a core network corresponding to the user. For related content, refer to the foregoing content, and details are not described herein again.

Step 202: The data obtaining network element sends a first request to a data providing network element when the first indication information indicates that the user allows obtaining the related data of the user, where the first request is used to obtain the related data of the user.

Correspondingly, the data providing network element receives the first request from the data obtaining network element.

The data providing network element in step 202 is a network element in which the related data of the user that the data obtaining network element wants to obtain in step 201 is located. For example, the data providing network element may be an NF network element, an AF network element, a UE network element, or an OAM network element.

Step 203: The data providing network element sends a first response to the data obtaining network element, where the first response includes the related data of the user.

Correspondingly, the data obtaining network element receives the first response from the data providing network element.

It can be learned from step 201 to step 203 that the data obtaining network element obtains the authorization information of the user before capturing the related data of the user. In this way, the data obtaining network element obtains the related data of the user only when the user allows obtaining the related data. In this implementation, the related data of the user can be prohibited from being randomly obtained, and the related data of the user is protected.

In step 202, in an optional implementation, in addition to carrying an identifier of the user, the first request further carries the first indication information. In step 203, after receiving the first indication information sent by the data obtaining network element, the data providing network element may determine, based on the first indication information, whether to provide the related data of the user for the data obtaining network element. For example, the data providing network element then sends the first response to the data obtaining network element when the first indication information indicates that the user allows obtaining the related data of the user.

In another optional implementation, step 211 may be further included before step 203. Step 211: The data providing network element obtains the authorization information of the user, where the authorization information includes the first indication information. Further, in performing step 203, the data providing network element may determine, based on the first indication information, whether to provide the related data of the user for the data obtaining network element. For example, the data providing network element then sends the first response to the data obtaining network element when the first indication information indicates that the user allows obtaining the related data of the user.

In an optional implementation, the first request in step 202 may carry the identifier of the user, and may further carry any one or more of an identifier of an area in which the user is located, an identifier of a user group to which the user belongs, an identifier of a network slice corresponding to the user, a data network name DNN corresponding to the user, and an identifier of a network element corresponding to the user. Optionally, the first request may further carry a filter condition. The filter condition is used to limit data that the data obtaining network element wants to obtain, for example, the related data of the user in a specific time and a specific location range that the data obtaining network element needs to obtain. In this embodiment of this application, the filter condition may be any one or more of time information, location information, a service type, data network name DNN information, a service identifier, a data type, and network slice information.

Step 205 may be further included after step 203.

Step 205: Determine a data analysis result, and feed back the data analysis result to any one or more of the following objects: an access network element, a core network element, an application server, a network management network element, and a terminal device.

The data analysis result is used by the corresponding network element or device to perform any one or more of the following operations: formulation of a mobility management policy, formulation of a charging and control policy, formulation of a session management policy, and formulation of a user plane selection policy.

For example, an NWDAF network element determines a voice service experience analysis result (for example, a voice service MOS evaluation score) of a user based on related service data of a voice service of the user obtained from an AF network element and network data corresponding to the voice service data of the user from a network, and feeds back the service experience analysis result of the user to a PCF network element, so that the PCF network element adjusts a quality of service QoS parameter corresponding to the voice service of the user based on the service experience analysis result.

For another example, an NWDAF network element determines a mobility analysis result of a user based on network location information of the user obtained from a network AMF network element, re-registration frequency information of the user, and track information of the user from an AF network element, and the NWDAF network element feeds back the mobility analysis result of the user to an AMF network element, so that the AMF network element optimizes a paging policy for the user based on the mobility analysis result of UE. Optionally, an entity that performs data analysis processing on the related data of the user may be the data obtaining network element, or may be another network element. When the entity is the another network element, the data obtaining network element needs to provide the obtained related data of the user for the another network element that performs data analysis processing.

As shown in FIG. 2, in step 201, the data obtaining network element obtains the authorization information of the user in a plurality of manners. For example, the authorization information may be pre-stored on the data obtaining network element, may be obtained from a data management network element, or obtained after the data obtaining network element sends a query to and receives a response from a terminal device used by the user. That the data obtaining network element sends the query to the terminal device may be that the data obtaining network element directly sends the query to the terminal device used by the user, or may be that the data obtaining network element sends the query to the terminal device used by the user by using another network element. The authorization information of the user may also be pre-stored on the data management network element. The data management network element may be a UDM network element, a UDR network element, or an AF network element, for example, an SMSF network element, an IMS server, or a third-party service server.

Figure 3A:
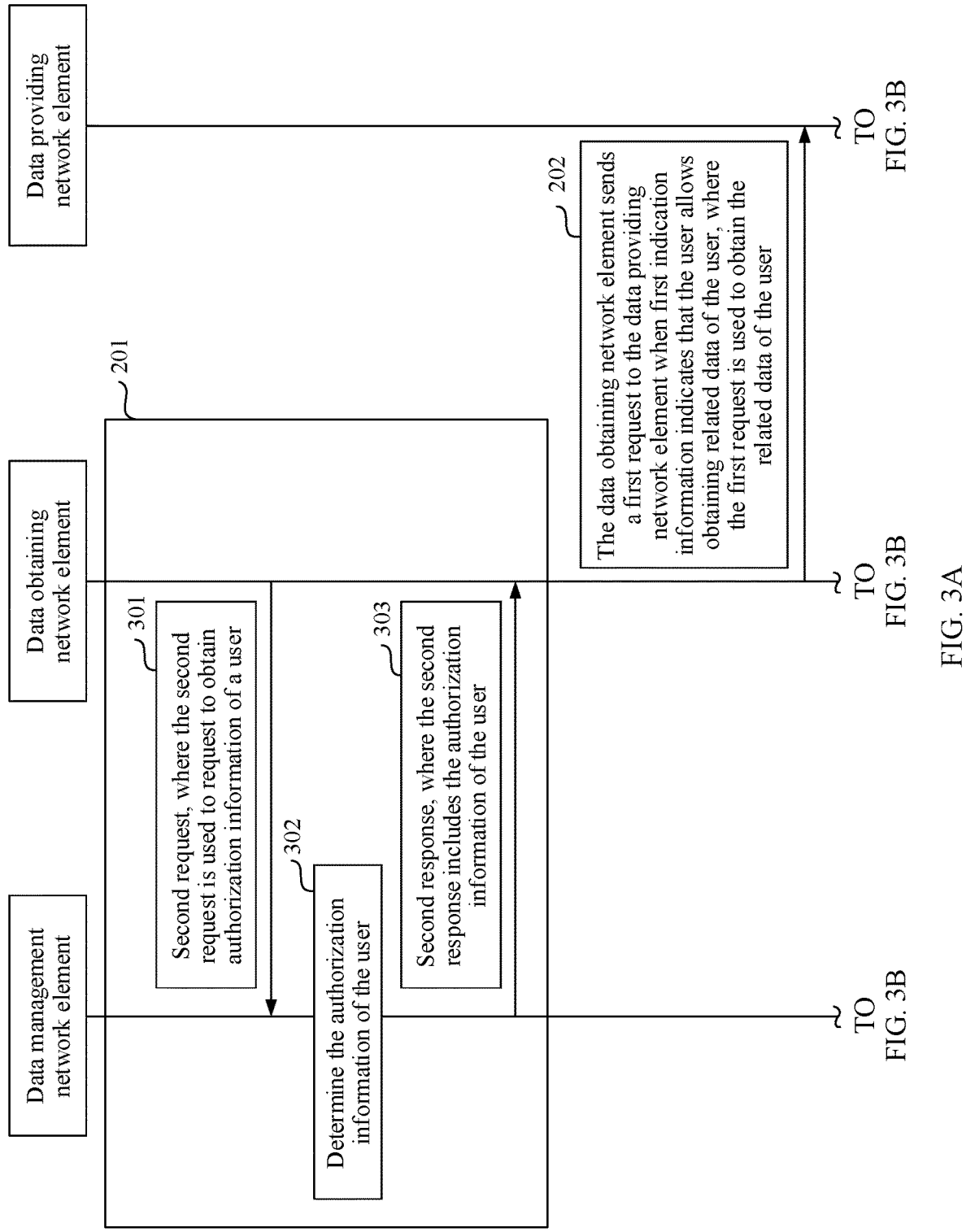
FIG. 3A and FIG. 3B are a schematic flowchart of another communication method according to an embodiment of this application.
Figure 3B:
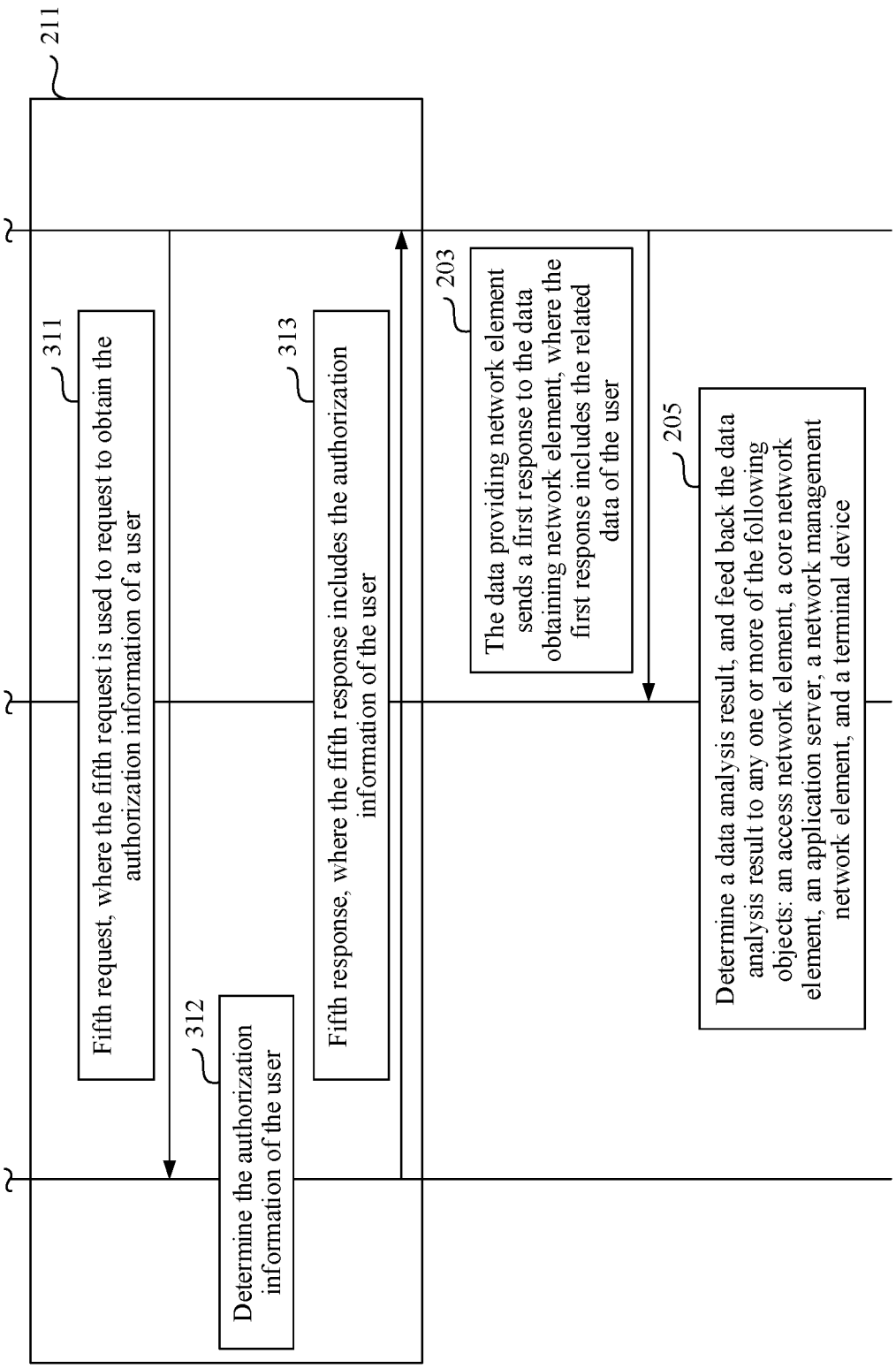

Based on the foregoing content, FIG. 3A and FIG. 3B provide a possible implementation for the solution in which the data obtaining network element obtains the authorization information of the user in step 201. FIG. 3A and FIG. 3B are a schematic flowchart of an example of a communication method according to an embodiment of this application. As shown in FIG. 3A and FIG. 3B, the method includes the following steps:

Step 301: The data obtaining network element sends a second request to a data management network element, where the second request is used to request to obtain the authorization information of the user.

Correspondingly, the data management network element receives the second request sent by the data obtaining network element.

Step 302: The data management network element determines the authorization information of the user, where the authorization information includes the first indication information.

Step 303: The data management network element sends a second response to the data obtaining network element, where the second response includes the authorization information of the user.

Correspondingly, the data obtaining network element receives the second response from the data management network element.

In step 302, the data management network element may pre-store the authorization information of the user. In this case, the data management network element may be, for example, a UDM network element and a UDR network element, or may be another network element. For ease of description, descriptions are provided below by using an example in which the data management network element is a UDM network element. For example, when the data management network element is the UDM network element, the authorization information of the user may be stored in subscription information stored in the UDM network element in advance. In other words, when the user performs subscription, the authorization information of the user may be set. The authorization information of the user is stored in the UDM network element as a part of the subscription information. The data obtaining network element may invoke a Nudm_SDM_Get service provided by the UDM network element through a service-oriented interface to obtain the subscription information of the user.

It should be noted that step 301 may be triggered by the data obtaining network element to the UDM network element when the data obtaining network element determines that the related data of the user needs to be obtained. Step 301 may also be initiated by the data obtaining network element in advance, that is, performing of step 301 does not depend on whether the data obtaining network element needs to obtain the related data of the user.

It should be noted that the data obtaining network element may obtain authorization information of only one user from the UDM network element at a time. In this scenario, the data obtaining network element provides the UDM network element with an identifier of the user. Correspondingly, the UDM network element feeds back the authorization information of the user to the data obtaining network element at a time. In another implementation, the data obtaining network element may also obtain authorization information of a plurality of users from the UDM network element at a time. In this scenario, the data obtaining network element provides the UDM network element with information that can indicate identifiers of the plurality of users. The identifiers of the users may be an identifier of a user group, identifier of areas in which the plurality of users are located, identifiers of network elements, identifiers of network slices, DNNs, or the like. Correspondingly, the UDM network element feeds back the authorization information of the plurality of users to an NWDAF network element at a time.

In step 301, the second request includes any one or more of the following content: an identifier of an area in which the user is located, an identifier of the user, an identifier of a user group to which the user belongs, an identifier of a network slice corresponding to the user, a data network name DNN corresponding to the user, and an identifier of a network element to which the user belongs. A network element to which a terminal device belongs is specifically a network element that provides a service for the user. For example, if the data obtaining network element wants to obtain related data of all users served by a UPF, the data obtaining network element may include an identifier of a network element to which the users belong, namely, an identifier of the UPF, in the second request. For another example, if the data obtaining network element wants to obtain related data of a user in an area (for example, a cell), the data obtaining network element may include an identifier of an area in which the user is located in the second request. When the area is a cell, the identifier of the area may be an identifier of a cell, or address information of a specific location.

In specific implementation, in an optional implementation, when the authorization information of the user is obtained from a UDM/UDR, the identifier information of the user may be an IMSI, an SUPI, a GPSI, an IMEI, or the like of UE. When the authorization information of the user is obtained from an AF, the identifier information of the user may be information of an IP 5-tuple of the UE.

In step 301, in an optional implementation, the second request further includes a filter condition; and the second request is used to request to obtain the authorization information of the user that meets the filter condition. Optionally, the filter condition includes any one or more of the following content: time information, location information, a service type, data network name DNN information, a service identifier, a data type, and network slice information. The filter condition matches a limitation condition in the authorization information. Descriptions are provided with reference to Table 1. If the time 2 in Table 1 is a time period 8:00 to 9:00, and if the filter condition includes time information and the time information is 8:05 in this case, it can be learned that the time falls within the time 2. Therefore, it may be determined that the time information 8:05 in the filter condition matches 8:00 to 9:00 in the limitation condition in this case. The first indication information corresponding to the condition time 2 may be queried.

For another example, descriptions are provided with reference to Table 1. If the time 2 in Table 1 is a time period from 8:00 to 9:00, and the area 1 is a cell 1, and if the filter condition includes time information, location information, and a service type in this case, where the time information is 8:05, the location information is an address and the address belongs to the cell 1, and the service type is a voice service, it may be determined that the time information 8:05 in the filter condition matches 8:00 to 9:00 in the limitation condition, the location information in the filter condition matches the area 1 in the limitation condition, the service type in the filter condition is the voice service and matches the voice service in the limitation condition. In this case, the first indication information corresponding to the related data of the user corresponding to the voice service in the time 2 and the area 2 may be queried.

For step 203 in which the data providing network element sends the first response to the data obtaining network element, the data providing network element may directly feed back the first response to the data obtaining network element after receiving the first request. In another optional implementation, the data providing network element may also obtain the authorization information of the user, and perform verification again, to provide one more layer of assurance for the related data of the user. Specifically, after obtaining the authorization information of the user, when determining that the first indication information included in the authorization information of the user indicates that related information of the user is allowed to be obtained, the data providing network element feeds back the first response, for example, the step 211. For a solution in which the data providing network element obtains the authorization information of the user, FIG. 3A and FIG. 3B further provide a possible implementation. As shown in FIG. 3A and FIG. 3B, the following steps are included.

Step 311: The data providing network element sends a fifth request to the data management network element, where the fifth request is used to request to obtain the authorization information of the user.

Correspondingly, the data management network element receives the fifth request sent by the data providing network element.

Step 312: The data management network element determines the authorization information of the user, where the authorization information includes the first indication information.

Step 313: The data management network element sends a fifth response to the data providing network element, where the fifth response includes the authorization information of the user.

Correspondingly, the data providing network element receives the fifth response from the data management network element.

In an optional implementation, the data management network element may invoke a Nudm_UECM_Get_response service to feed back the authorization information of the user to the data providing network element.

In step 312, the data management network element may pre-store the authorization information of the user. Related content in this part is similar to the foregoing content, and details are not described herein again.

It should be noted that step 311 may be triggered by the data providing network element to the UDM network element when the data providing network element determines that the related data of the user needs to be provided. Step 311 may also be initiated by the data providing network element in advance, that is, performing of step 311 does not depend on whether the data providing network element needs to provide the related data of the user.

It should be noted that the data providing network element may provide authorization information of only one user for the UDM network element at a time. In this scenario, the data providing network element provides the UDM network element with an identifier of the user. Correspondingly, the UDM network element feeds back the authorization information of the user to the data providing network element at a time. In another implementation, the data providing network element may also provide authorization information of a plurality of users for the UDM network element at a time. In this scenario, the data providing network element provides the UDM network element with information that can indicate identifiers of the plurality of users. Correspondingly, the UDM network element feeds back the authorization information of the plurality of users to an NWDAF network element at a time.

In step 311, the fifth request includes any one or more of the following content: an identifier of an area in which the user is located, an identifier of the user, an identifier of a user group to which the user belongs, an identifier of a network slice corresponding to the user, a data network name DNN corresponding to the user, and an identifier of a network element to which the user belongs. Related content about the identifier of the area in which the user is located, the identifier of the user, the identifier of the user group to which the user belongs, the identifier of the network slice corresponding to the user, the data network name DNN corresponding to the user, and the identifier of the network element to which the user belongs is similar to the foregoing content, and details are not described herein again.

In step 311, in an optional implementation, the fifth request further includes a filter condition; and the fifth request is used to request to obtain the authorization information of the user that meets the filter condition. Related content in this part is similar to the foregoing content, and details are not described herein again.

Figure 4A:
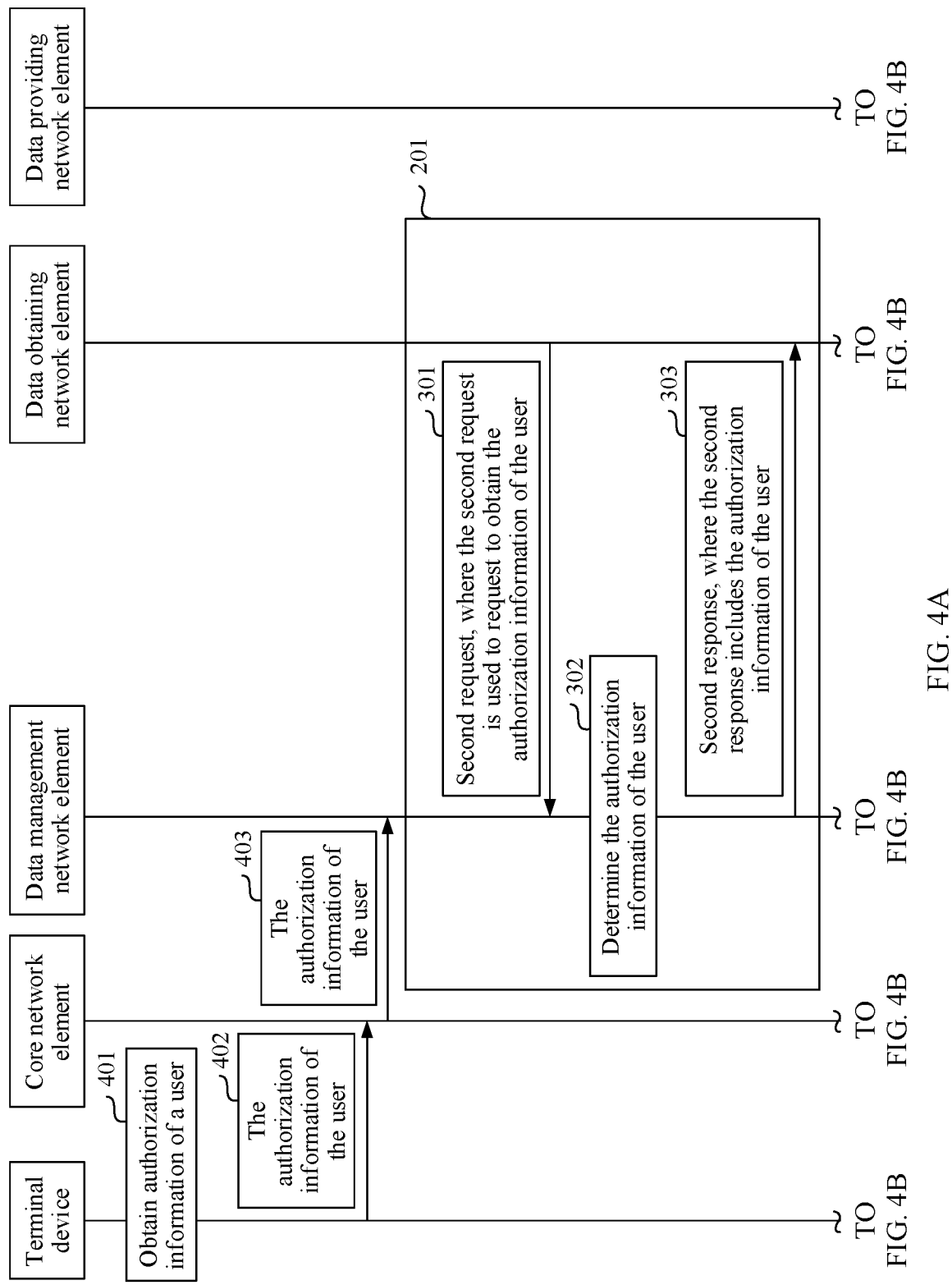
FIG. 4A and FIG. 4B are a schematic flowchart of another communication method according to an embodiment of this application.
Figure 4B:
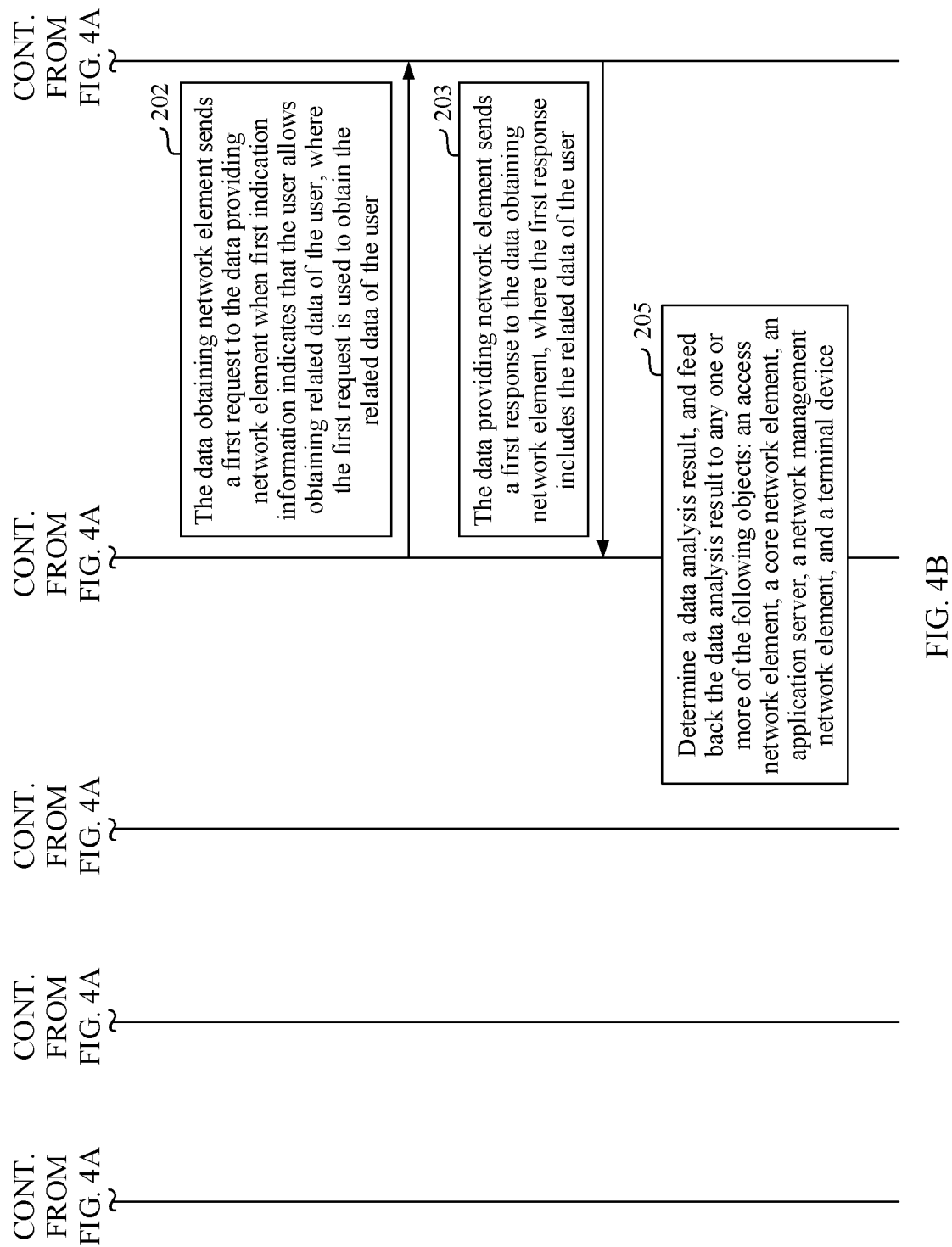

The data management network element determines the authorization information of the user in a plurality of manners. In addition to being pre-stored in the subscription information of the user, the authorization information of the user may further be determined in a plurality of manners, which is described in the following by using FIG. 4A and FIG. 4B, FIG. 5A to FIG. 5C, FIG. 6A to FIG. 6C, and FIG. 7A and FIG. 7B. Based on how a data management network element obtains authorization information of a user, FIG. 4A and FIG. 4B are a schematic flowchart of an example of a communication method according to an embodiment of this application. As shown in FIG. 4A and FIG. 4B, the method includes the following steps:

Step 401: A terminal device obtains authorization information of a user.

The authorization information includes first indication information.

A user may enter the authorization information of the user on the terminal device.

In step 401, optionally, a human-computer interaction interface (UI) or a dialog box may be disposed on the terminal device, and is used to collect an instruction of whether the user using the terminal device authorizes related data of the user to be obtained or used by a network. The interaction interface or dialog box may be configured on the terminal device, and is triggered and pop-up by using an instruction from the terminal device, for example, an operation in which the user taps a Wi-Fi switch to enable or disable a wireless local area network. The user may tap a switch or a button on the terminal device to enter the interaction interface, to enable or disable a data authorization switch for the user. Enabling the data authorization switch means that the user allows obtaining the related data of the user, and disabling the data authorization switch means that the user disallows obtaining the related data of the user.

Step 402: The terminal device sends the authorization information of the user to a core network element.

Correspondingly, the core network element receives the authorization information of the user sent by the terminal device.

Step 403: The core network element sends the authorization information of the user to a data management network element.

In step 403, the core network element may be an AMF network element, and the data management network element may be a UDM network element. For example, the AMF network element may directly send the authorization information of the user to the UDM network element. In another optional implementation, the AMF network element may also forward the authorization information of the user to an SMF network element, an AUSF network element, or the like, and then the SMF network element, the AUSF network element, or the like, stores the authorization information of the user in the UDM network element.

There is no specific sequence between step 401 and step 403. Step 401 may be performed before step 403, or step 403 may be performed before step 401.

In step 402, the terminal device may send the authorization information of the user by using a NAS message. Specifically, the terminal device sends the NAS message to the core network element, where the NAS message includes the authorization information of the user. For example, the NAS message may be a registration request. In this case, the registration request includes the authorization information of the user. Correspondingly, the core network element receives the registration request sent by the terminal device.

In an optional implementation, the terminal device may be divided into different modules, and each module is responsible for a corresponding operation. In this embodiment of this application, it is generally considered that a human-computer interaction operation between the user and the terminal device is performed on an application layer module. The application layer module forms an application layer instruction (The instruction is used to indicate whether the related data of the user is authorized to be obtained, and may be further used to indicate whether the related data of the user is authorized to be used), and transfers the instruction downward to a non-access stratum (non-access stratum, NAS) layer module inside the terminal device. The NAS layer module generates one piece of NAS information (the NAS information includes the authorization information of the user) and forms the NAS message, where the NAS message includes the NAS information. The NAS layer transfers the NAS information downward to access server (AS) layer, and the AS layer is responsible for transferring the NAS information to a network side. An access network element in a network parses the NAS message from a received message sent by the AS layer of the terminal device, and transfers the NAS message to the core network element in the network. The core network element may be, for example, an AMF network element, an SMF network element, or an AUSF network element. The core network element parses and obtains the authorization information of the user.

For example, the NAS message formed by the terminal device may be a registration request (such as an attach request, a TAU request, an initial registration request, or a mobility registration request) message, a service request (such as, a service request) message, a session establishment (for example, a PDU session establishment) request, a session modification (for example, a PDU session modification) request specified in a standard protocol, or may be another NAS message not defined in a newly added standard, for example, an authorization information notification message. The NAS message includes the data authorization information of the UE.

The terminal device sends, to the core network element (the core network element is, for example, an AMF network element, an SMF network element, or an AUSF network element), the NAS message including the NAS information. Subsequently, the core network element is responsible for parsing the NAS information in the NAS message, and sending the NAS information to the data management network element (the data management network element is, for example, a UDM network element or a UDR network element) for storage. If the terminal device sends the NAS message including the NAS information to the SMF network element, optionally, the terminal device may include the NAS information (the NAS information includes the authorization information of the user) in a protocol configuration option (protocol configuration option, PCO) information element. The PCO information element is equivalent to a transparent container and carries the authorization information of the user. The PCO information element is transmitted to the AMF network element. The AMF network element transparently transmits the PCO information element to the SMF network element (the AMF network element does not parse the PCO). The SMF network element parses the PCO information element and obtains the authorization information of the user. A similar method may also be used when the terminal device sends the NAS message including the NAS information to the AUSF network element.

In the foregoing example, after receiving the NAS message that is sent by the terminal device and that includes the authorization information of the user, the core network element (the AMF network element, the SMF network element, or the AUSF network element) may send a Nudm_UECM_Registration service request to the data management network element. The Nudm_UECM_Registration service request is used for registration. The Nudm_UECM_Registration service request includes the authorization information of the user. Correspondingly, the data management network element receives the authorization information of the user, and stores the authorization information in the registration information of the user.

In another optional implementation, after receiving the NAS message that is sent by the terminal device and that includes the authorization information of the user, the core network element (the AMF network element, the SMF network element, or the AUSF network element) may send a Nudm_UECM_Update service request to the data management network element. The Nudm_UECM_Update service request is used to update context information of the user. The Nudm_UECM_Update service request includes the authorization information of the user. Correspondingly, the data management network element receives the authorization information of the user, and stores the authorization information in the context information of the user.

In other words, the authorization information of the user may be stored on the data management network element as a part of the registration information of the user, or may be stored on the data management network element as the context information of the user. When a data obtaining network element needs to obtain the authorization information of the user, the data obtaining network element may send a Nudm_UECM_Get request request to the data management network element, so as to request a context of the user. The data management network element sends the data obtaining network element a Nudm_UECM_Get response which carries the authorization information of the user.

FIG. 5A to FIG. 5C are a schematic flowchart of an example of a communication method according to an embodiment of this application. As shown in FIG. 5A to FIG. 5C, the method includes the following steps:

Step 501: A terminal device sends a registration request to a core network element.

Correspondingly, the core network element receives the registration request sent by the terminal device.

Specifically, the core network element in this step may be an AMF network element.

Step 502: The core network element sends a fourth request to the terminal device, where the fourth request is used to request authorization information of a user.

Correspondingly, the terminal device receives the fourth request sent by the core network element.

In other words, in this embodiment, the AMF network element is fixedly configured to initiate, to the terminal device in a UE registration procedure, the request used to request the authorization information of the user.

The core network element in this step may be an AMF network element, or may be another network element, for example, an SMF network element or an AUSF network element. When the core network element is the AMF network element, the AMF network element may directly send the fourth request. When the core network element is the SMF network element or the AUSF network element, the SMF network element or the AUSF network element may send the fourth request by using an AMF network element.

Step 503: The terminal device sends a fourth response to the core network element, where the fourth response includes the authorization information of the user.

Correspondingly, the core network element receives the fourth response from the terminal device.

After step 503, the foregoing step 403 may be continued, so that the data management network element obtains the authorization information of the user.

Figure 6B:
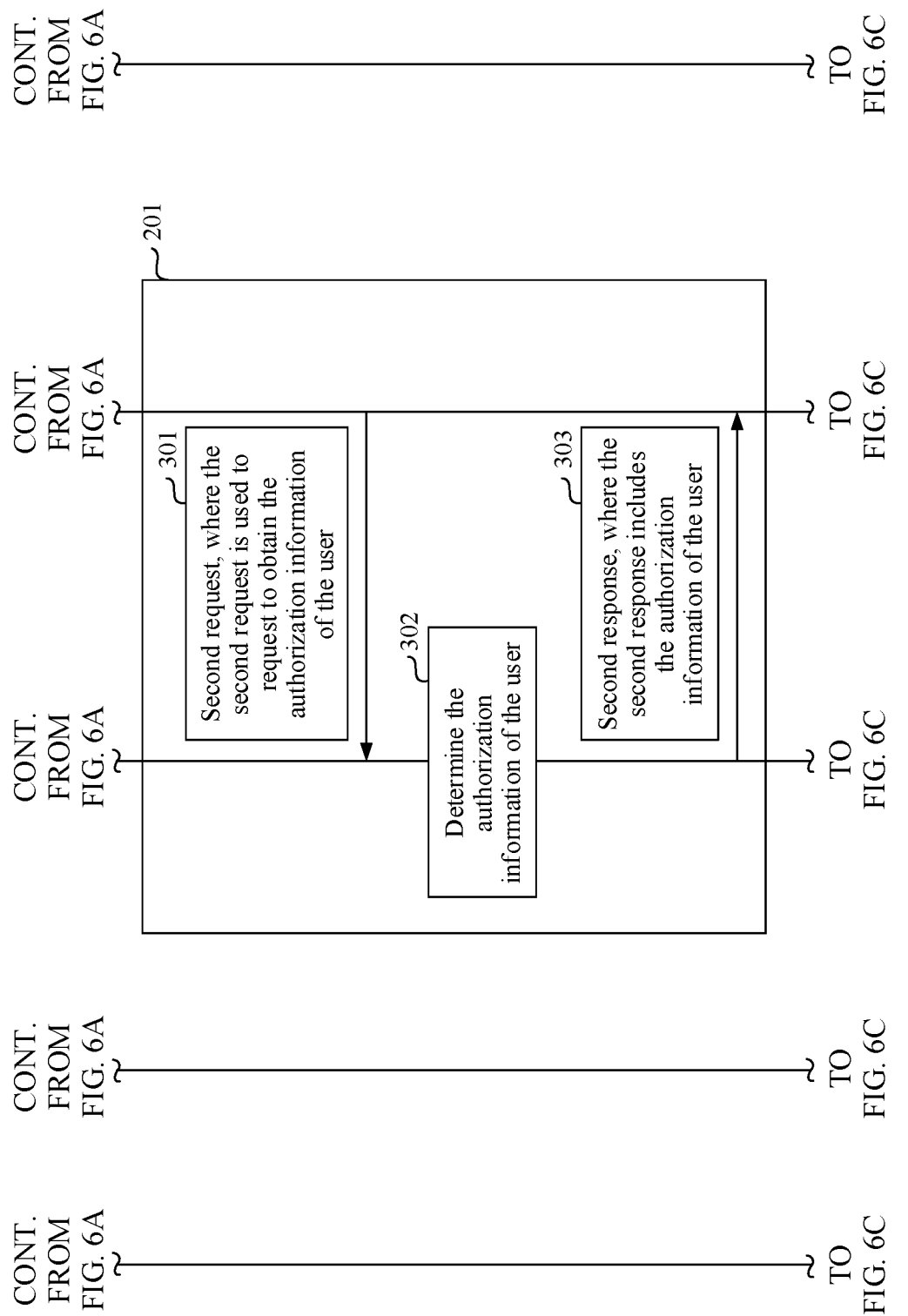

The data management network element obtains the authorization information of the user in a plurality of manners. In addition to being pre-stored in subscription information of the user, the authorization information of the user may further be obtained in a plurality of manners, which is described in below. Based on how a data management network element obtains authorization information of a user, FIG. 6A to FIG. 6C are a schematic flowchart of an example of a communication method according to an embodiment of this application. As shown in FIG. 6A to FIG. 6C, the method includes the following steps:

Step 601: A data management network element sends a third request to a core network element, where the third request is used to request authorization information of a user.

Correspondingly, the core network element receives the third request sent by the data management network element.

In an optional implementation, the data management network element may initiate the third request after receiving a second request sent by a data obtaining network element. In another optional implementation, after receiving the second request sent by the data obtaining network element, the data management network element may first perform searching in a local storage area of the data management network element, and then initiate the third request if the authorization information of the user cannot be found. The second request may be a Nudm_UECM_Get_request service, and may carry an identifier of the user and a filter condition. For content of the filter condition, refer to the foregoing content, and details are not described herein again. The third request may be a Namf_eventexposure_subscribe service request or an Nsmf_eventexposure_subscribe service request.

Step 602: The core network element sends a sixth request to a terminal device, where the sixth request is used to request the authorization information of the user.

Correspondingly, the terminal device receives the sixth request sent by the core network element.

In an optional implementation, the sixth request may be a NAS message defined in a standard, for example, an authentication and authorization request message, or may be a newly added NAS message that is not defined in a standard. The sixth request may carry the identifier of the user and a filter condition. For content of the filter condition, refer to the foregoing content, and details are not described herein again.

When the core network element is the AMF network element, the AMF network element may directly send the sixth request. When the core network element is the SMF network element or the AUSF network element, the SMF network element or the AUSF network element may send the sixth request by using an AMF network element.

In an optional implementation, in addition to requesting the authorization information of the user, the sixth request may be further used to subscribe to a change of the authorization information of the user.

In an optional implementation, after the core network element receives the third request, the core network element may immediately trigger sending of the sixth request to the terminal device regardless of a mode (a connected mode or an idle mode) of the terminal device of the user. If the terminal device is in the idle mode in this case, the core network element further needs to first page the terminal device to be in the connected mode, so as to send the message to the terminal device. In another possible implementation, the core network element may temporarily suspend sending the sixth request to the terminal device, but wait for the terminal device to enter the connected mode due to a service requirement, and then send the sixth request to the terminal device. This operation is to minimize signaling overheads caused by the request. In addition, if the to-be-obtained authorization information of the user is authorization information of the user corresponding to a specific time, a specific area, a specific service type, a specific service identifier, a specific data type, a specific DNN, and a specific slice, the core network element may preferably wait for the terminal device to enter the connected mode in the specific time, in the specific area, in the specific DNN, or in the specific slice, and then send the authorization information request message to the terminal device, or send the message when the terminal device initiates a session corresponding to the specific service type, the specific service identifier, or the specific data type.

Step 603: The terminal device sends a sixth response to the core network element, where the sixth response includes the authorization information of the user.

Correspondingly, the core network element receives the sixth response from the terminal device.

The sixth response may be a NAS message defined in a standard, for example, an authentication and authorization response message, or may be a newly added NAS message that is not defined in a standard.

Step 604: The core network element sends a third response to the data management network element, where the third response includes the authorization information of the user.

Correspondingly, the data management network element receives the third response from the core network element.

The third response may be a Namf_eventexposure_notify service message or an Nsmf_eventexposure_notify service message.

Figure 7A:
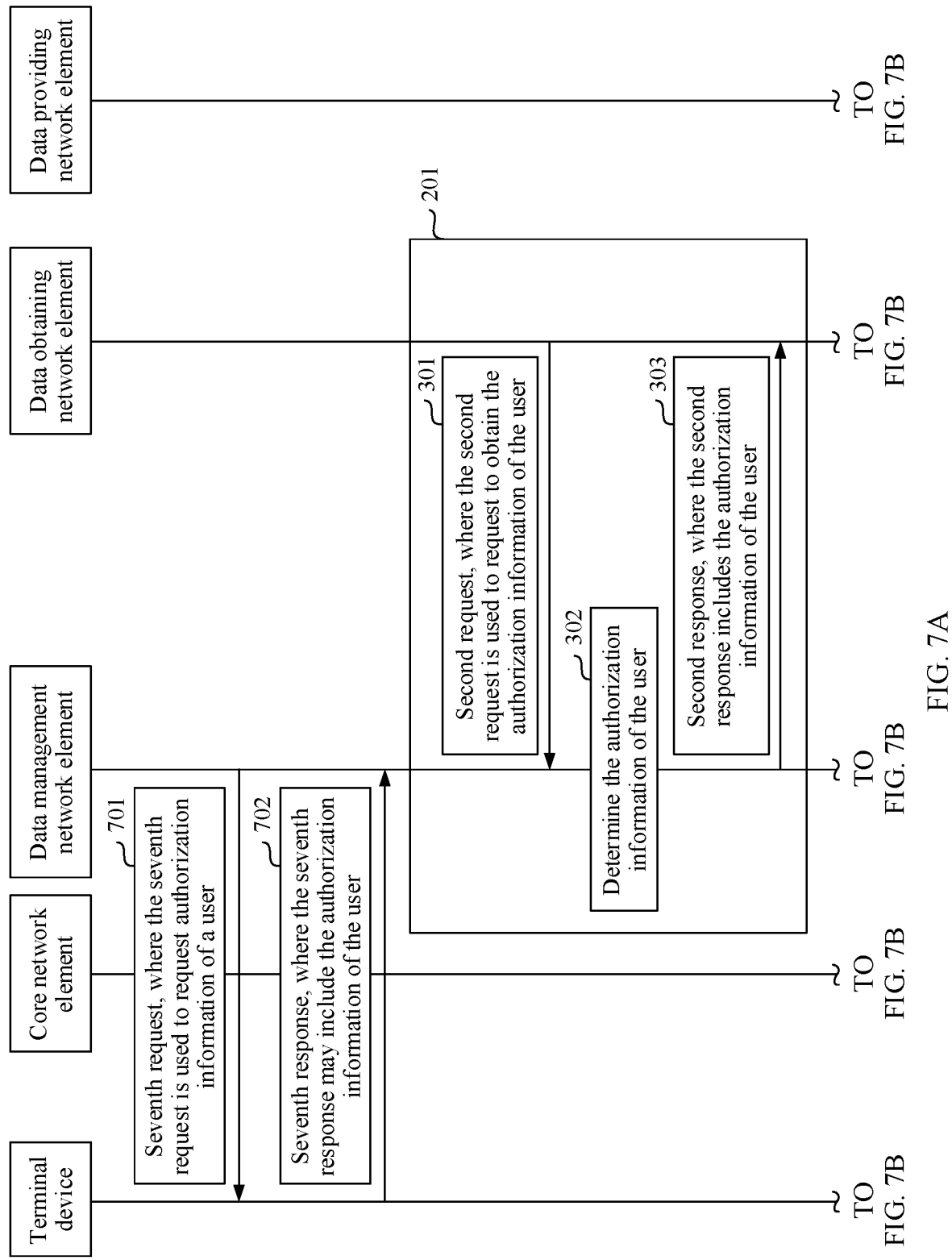
FIG. 7A and FIG. 7B are a schematic flowchart of another communication method according to an embodiment of this application.
Figure 7B:
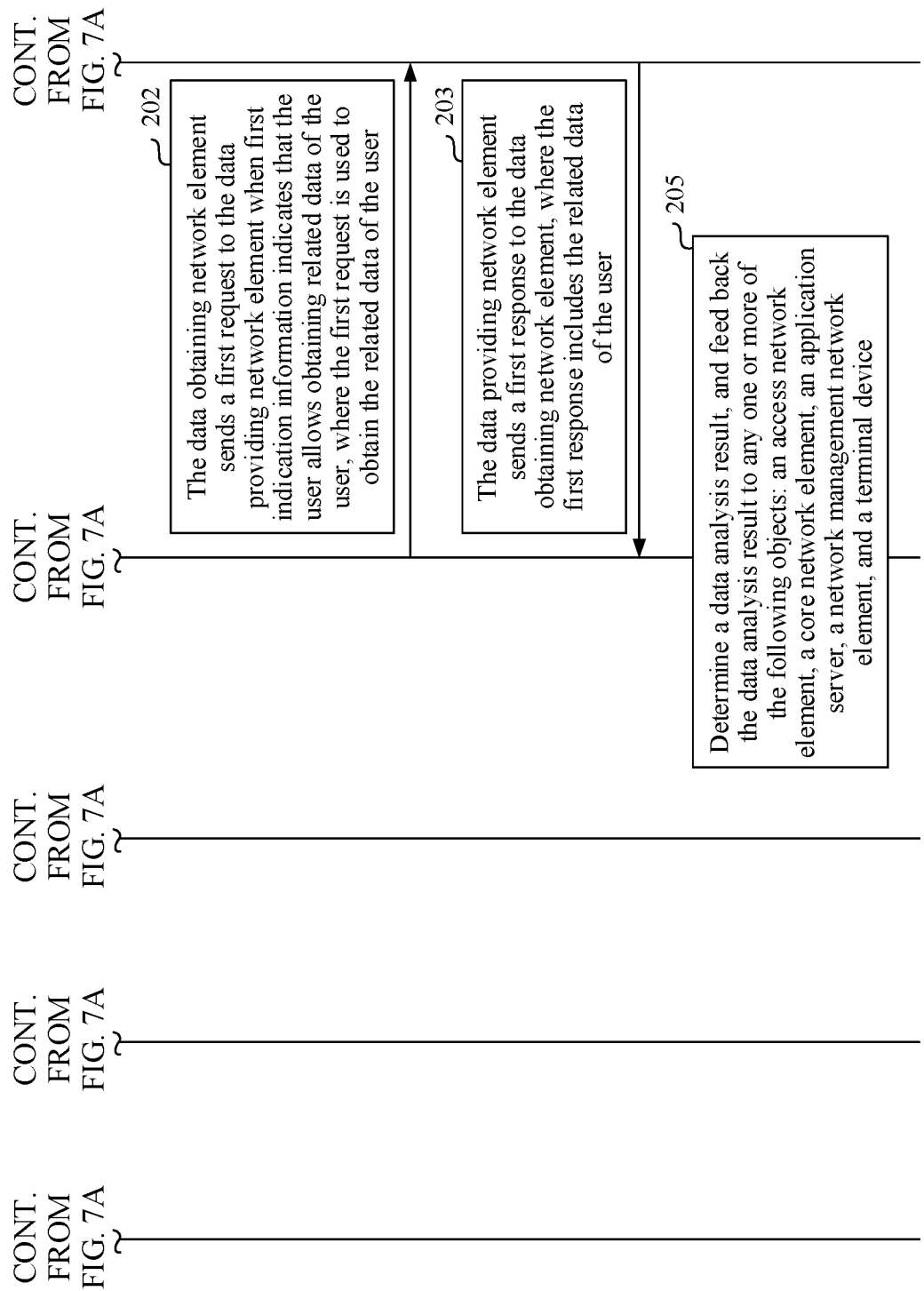

FIG. 7A and FIG. 7B are a schematic flowchart of an example of a communication method according to an embodiment of this application. As shown in FIG. 7A and FIG. 7B, the method includes the following steps:

Step 701: A data management network element sends a seventh request to a terminal device, where the seventh request is used to request authorization information of a user.

Correspondingly, the terminal device receives the seventh request.

When the data management network element is an AF network element, the seventh request may be an application layer message, namely, a message formulated according to an application layer protocol. The seventh request may include an identifier of the user and a filter condition.

Step 702: The data management network element receives a seventh response sent by the terminal device, where the seventh response may include the authorization information of the user.

In this embodiment, for step 203, the data providing network element sends a first response to the data obtaining network element, where the first response includes the related data of the user. Specifically, the data providing network element may be an NF network element, an OAM network element, or a UE network element. In this case, the data obtaining network element may obtain, from the NF network element, the OAM network element, and the UE network element, the network data or data on a terminal device of the user related to a service provided by an AF network element. In another embodiment, the data providing network element may be an AF network element. In this case, the data obtaining network element may obtain the related application server data of the user from the AF network element. For example, in this implementation, the data obtaining network element may obtain any one or more of application server data of the user related to a service provided by the AF network element (for example, a MOS score of a voice service), network data of the user related to the service provided by the AF network element (for example, 5Q1=1 corresponding to the voice service, a flow bit rate, a packet loss rate related to a QoS flow, and a transmission start time of a data packet), data (for example, a coding manner of the voice service) on a terminal device related to the service provided by the AF network element.

In this implementation, the user may determine whether to authorize the network to obtain or use the related data of the user related to a service. Based on the authorization information of the user, the network element determines whether the user data related to the service of the user can be obtained, so as to ensure validity of obtaining and using the data.

Figure 8:
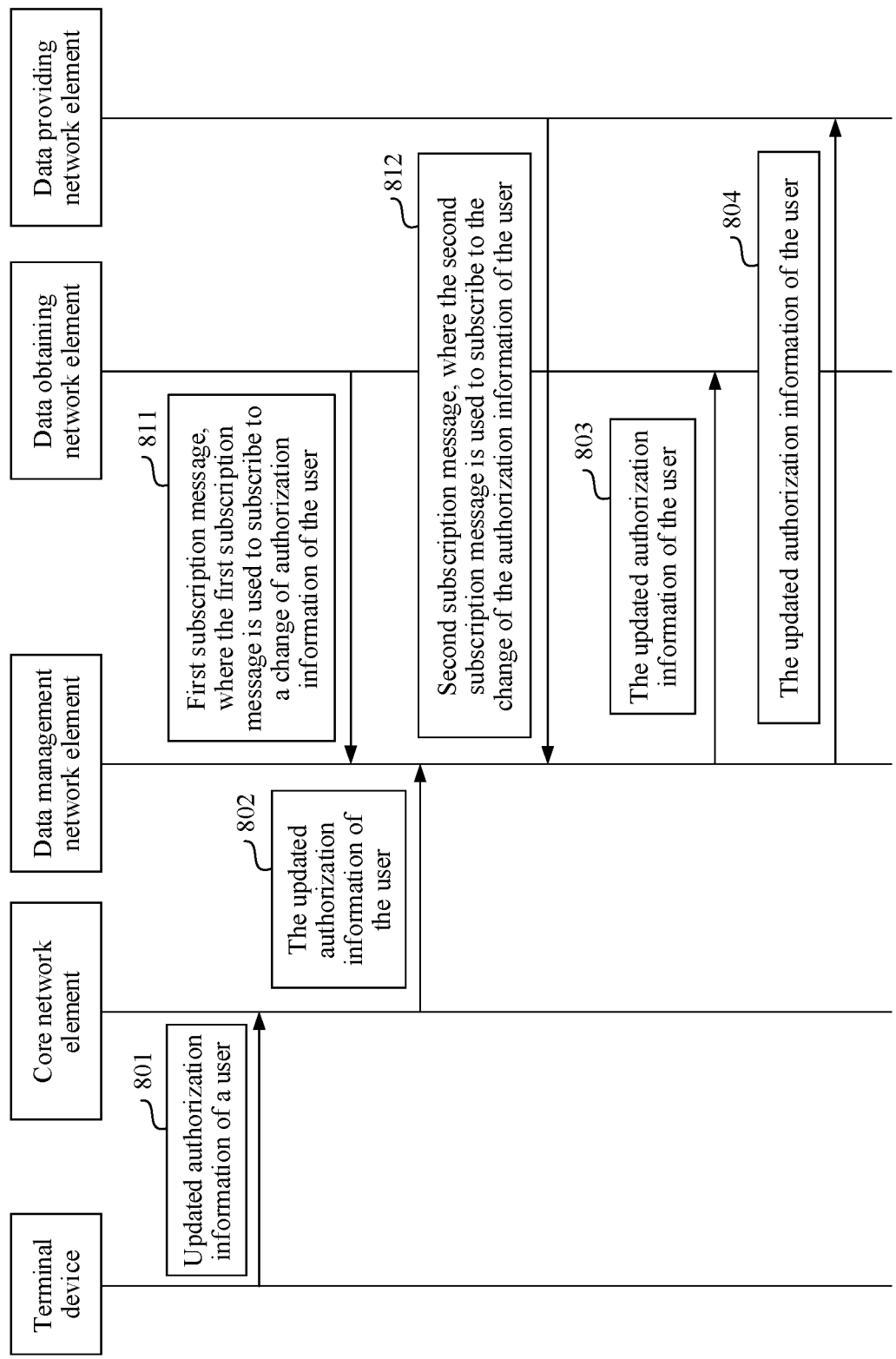
FIG. 8 is a schematic flowchart of another communication method according to an embodiment of this application.

Based on the foregoing content, FIG. 8 is a schematic flowchart of an example of a communication method according to an embodiment of this application. As shown in FIG. 8, the method includes the following steps:

Step 801: A terminal device sends updated authorization information of a user to a core network element.

In step 801, in an optional implementation, when the user is a person or an object that uses the terminal device, the user may modify authorization information of the user in a human-computer interaction interface or a dialog box on the terminal device.

In step 801, the terminal device may send the updated authorization information to a network side by sending a NAS message defined in a standard. For example, the terminal device sends a registration update request, or a session modification request message, which includes the updated authorization information of the user. Alternatively, the terminal device may send a new customized NAS message, for example, a notification message about the authorization information of the user or an update message about the authorization information of the user. The notification message about the authorization information of the user and the update message about the authorization information of the user include the updated authorization information of the user.

Correspondingly, the core network element receives the updated authorization information of the user sent by the terminal device.

Step 802: The core network element sends the updated authorization information of the user to a data management network element.

Correspondingly, the data management network element obtains the updated authorization information of the user.

Step 803: The data management network element sends the updated authorization information of the user to a data obtaining network element.

Correspondingly, the data obtaining network element obtains the updated authorization information of the user, and may obtain related data of the user based on the updated authorization information of the user.

Step 804: The data management network element sends the updated authorization information of the user to a data providing network element. Correspondingly, the data providing network element obtains the updated authorization information of the user, and provides related data of the user based on the updated authorization information of the user.

In step 804, the data management network element may invoke a Nudm_EventExposure_Notify service to send the updated authorization information of the user to the data providing network element.

There is no specific sequence between step 803 and step 804. In step 803 and step 804, the updated user authorization information may be pushed automatically, or may be implemented through subscription.

Before step 803, step 811 is further included, and before step 804, step 812 is further included. There is no specific sequence between step 811 and step 812.

Step 811: The data obtaining network element sends a first subscription message to the data management network element, where the first subscription message is used to subscribe to a change of the authorization information of the user.

Correspondingly, the data management network element receives the first subscription message sent by the data obtaining network element.

In other words, the data obtaining network element may obtain the updated authorization information of the user through subscription Step 812: The data providing network element sends a second subscription message to the data management network element, where the second subscription message is used to subscribe to a change of authorization information of the user.

Correspondingly, the data management network element receives the second subscription message sent by the data providing network element.

In other words, the data providing network element may obtain the updated authorization information of the user through subscription. The first subscription message and the second subscription message may be implemented by invoking a Nudm_EventExposure_Subscribe service.

In the embodiment provided in FIG. 8, for example, if first indication information corresponding to a limitation condition of the user changes from "disallow" to "allow", or changes from "unknown" to "allow", the data obtaining network element may obtain, from the data providing network element, related data of the user under the limitation condition.

If the first indication information corresponding to the limitation condition of the user changes from "allow" to "unknown", or changes from "disallow" to "unknown", the data obtaining network element may not obtain, from the data providing network element, related data of the user under the limitation condition. Alternatively, a signaling procedure may be triggered to ask the user whether to allow the related data of the user corresponding to the specific limitation condition to be obtained.

If the first indication information corresponding to the specific limitation condition of the user changes from "disallow" to "unknown", the data obtaining network element may not obtain, from the data providing network element, the related data of the user under the limitation condition. Alternatively, a signaling procedure may be triggered to ask the user whether to allow the related data of the user corresponding to the specific limitation condition to be obtained.

If the first indication information corresponding to the specific limitation condition of the user changes from "allow" to "disallow", the data obtaining network element no longer obtains, from the data providing network element, the related data of the user under the limitation condition.

Further, optionally, if the data obtaining network element has subscribed to the change of the first indication information corresponding to the limitation condition, the data obtaining network element may send a subscription cancellation message, to indicate to no longer subscribe to the change of the first indication information corresponding to the limitation condition on the terminal device. Alternatively, it may be described as follows: The data obtaining network element also no longer subscribes to the change of authorization information of the user corresponding to the limitation on the terminal device, that is, if the first indication information corresponding to the limitation condition changes from "disallow" again, the authorization information of the user is not pushed to the data obtaining network element.

It should be noted that not all steps are mandatory in the method embodiments provided in FIG. 2 to FIG. 8. Some steps in the method embodiments provided in FIG. 2 to FIG. 8 are optional, for example, step 311, step 312, and step 313 in FIG. 3B.

Figure 9:
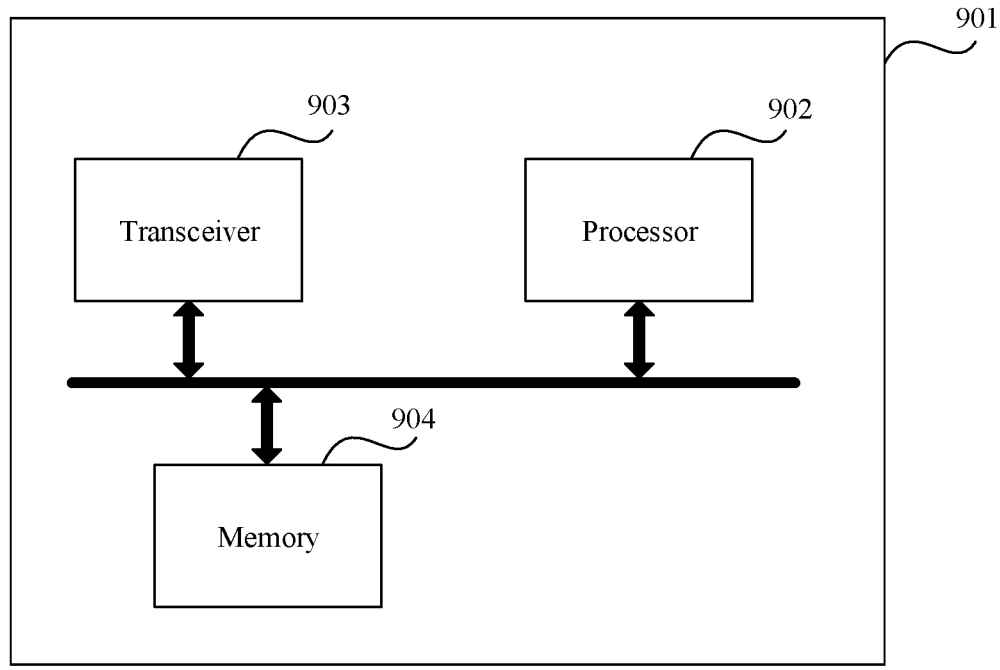
FIG. 9 is a schematic diagram of a structure of a communication device according to an embodiment of this application.

Based on the foregoing method, FIG. 9 is a schematic diagram of a structure of a communication device according to an embodiment of this application. As shown in FIG. 9, the communication device may be a terminal device or a network device, or may be a chip or a circuit, such as a chip or a circuit that can be disposed in the terminal device, or a chip or a circuit that can be disposed in the network device. The network device in this embodiment of this application may be any one or more of a data obtaining network element, a data management network element, a core network element, and a data providing network element.

Further, the communication device 901 may further include a bus system. A processor 902, a memory 904, and a transceiver 903 may be connected by using the bus system.

It should be understood that, the processor 902 may be a chip. For example, the processor 902 may be a field programmable gate array (field programmable gate array, FPGA), an application-specific integrated chip (application-specific integrated circuit, ASIC), a system on a chip (system on a chip, SoC), a central processing unit (central processing unit, CPU), a network processor (network processor, NP), a digital signal processor (digital signal processor, DSP), a micro controller unit (micro controller unit, MCU), a programmable controller (programmable logic device, PLD), or another integrated chip.

In an implementation process, steps of the foregoing methods may be implemented by using a hardware integrated logic circuit in the processor 902 or by using instructions in a form of software. Steps of the methods disclosed with reference to the embodiments of this application may be directly executed and accomplished by using a hardware processor, or may be executed and accomplished by using a combination of hardware and software modules in the processor 902. A software module may be located in a mature storage medium in the art, such as a random access memory, a flash memory, a read-only memory, a programmable read-only memory, an electrically erasable programmable memory, or a register. The storage medium is located in the memory 904, and the processor 902 reads information in the memory 904 and completes the steps in the foregoing methods in combination with hardware of the processor.

It should be noted that, the processor 902 in this embodiment of this application may be an integrated circuit chip, and has a signal processing capability. In an implementation process, steps in the foregoing method embodiments are implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and the logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory 904 in the embodiments of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example and not limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the systems and methods described in this specification includes but is not limited to these and any memory of another appropriate type.

When the communication device 901 corresponds to the data obtaining network element in the foregoing method, the communication device may include a processor 902, a transceiver 903, and a memory 904. The memory 904 is configured to store instructions. The processor 902 is configured to execute the instructions stored in the memory 904, to implement the related solution of the data obtaining network element in one or more corresponding methods shown in FIG. 1 to FIG. 8. The processor 902 is configured to: obtain authorization information of a user, where the authorization information includes first indication information, the first indication information indicates whether related data of the user is allowed to be obtained, and the related data of the user includes data on an access network corresponding to the user and/or data on a core network corresponding to the user; and send a first request to a data providing network element by using the transceiver 903 when the first indication information indicates that the user allows obtaining the related data of the user, where the first request is used to obtain the related data of the user. The transceiver 903 is configured to receive a first response from the data providing network element, where the first response includes the related data of the user.

When the communication device 901 is the data obtaining network element, the transceiver 903 is specifically configured to: send a second request to a data management network element, where the second request is used to request to obtain the authorization information of the user; and receive a second response from the data management network element, where the second response carries the authorization information of the user.

When the communication device 901 is the data obtaining network element, the processor 902 is further configured to: obtain updated authorization information of the user; and obtain the related data of the user based on the updated authorization information of the user.

When the communication device 901 is the data obtaining network element, the processor 902 is specifically configured to: obtain the updated authorization information of the user through subscription.

When the communication device 901 is the data obtaining network element, the processor 902 is further configured to: determine a data analysis result based on the related data of the user, and feed back the data analysis result to any one or more of the following objects by using the transceiver 903: an access network element, a core network element, an application server, a network management network element, and a terminal device.

When the communication device 901 corresponds to the data management network element in the foregoing method, the communication device may include a processor 902, a transceiver 903, and a memory 904. The memory 904 is configured to store instructions. The processor 902 is configured to execute the instructions stored in the memory 904, to implement the related solution of the data management network element in one or more corresponding methods shown in FIG. 1 to FIG. 8. The transceiver 903 is configured to receive a second request sent by a data obtaining network element, where the second request is used to request to obtain authorization information of a user; and send a second response to the data obtaining network element, where the second response includes the authorization information of the user. The processor 902 is configured to determine the authorization information of the user, where the authorization information includes first indication information, the first indication information indicates whether related data of the user is allowed to be obtained, and the related data of the user includes data on an access network corresponding to the user and/or data on a core network corresponding to the user.

When the communication device 901 corresponds to the data management network element in the foregoing method, the transceiver 903 is specifically configured to send a third request to a core network element, where the third request is used to request the authorization information of the user, and the core network element includes any one of an access and mobility management network element, a session management network element, and an authentication service function network element; and receive a third response from the core network element, where the third response includes the authorization information of the user.

When the communication device 901 corresponds to the data management network element in the foregoing method, the processor 902 is further configured to obtain updated authorization information of the user. The transceiver 903 is further configured to send the updated authorization information of the user to a data obtaining network element.

When the communication device 901 corresponds to the data management network element in the foregoing method, the transceiver 903 is further configured to receive a subscription message sent by a data obtaining network element, where the subscription message is used to subscribe to a change of the authorization information of the user.

When the communication device 901 corresponds to the core network element in the foregoing method, the communication device may include a processor 902, a transceiver 903, and a memory 904. The memory 904 is configured to store instructions. The processor 902 is configured to execute the instructions stored in the memory 904, to implement the related solution of the core network element in one or more corresponding methods shown in FIG. 1 to FIG. 8. The transceiver 903 is configured to receive authorization information of a user sent by a terminal device, where the authorization information includes first indication information, the first indication information indicates whether related data of the user is allowed to be obtained, and the related data of the user includes data on an access network corresponding to the user and/or data on a core network corresponding to the user; and send the authorization information of the user to a data management network element.

When the communication device 901 corresponds to the core network element in the foregoing method, the transceiver 903 is specifically configured to receive a registration request sent by the terminal device, where the registration request includes the authorization information of the user.

When the communication device 901 corresponds to the core network element in the foregoing method, the transceiver 903 is specifically configured to send a fourth request to the terminal device, where the fourth request is used to request the authorization information of the user; and receive a fourth response from the terminal device, where the fourth response includes the authorization information of the user.

When the communication device 901 corresponds to the core network element in the foregoing method, the transceiver 903 is further configured to receive a registration request sent by the terminal device.

When the communication device 901 corresponds to the core network element in the foregoing method, the transceiver 903 is further configured to receive a third request sent by a data management network element, where the third request is used to request the authorization information of the user; and send a third response to the data management network element, where the third response includes the authorization information of the user.

When the communication device 901 corresponds to the core network element in the foregoing method, the transceiver 903 is further configured to receive updated authorization information of the user sent by the terminal device; and send the updated authorization information of the user to the data management network element.

When the communication device 901 corresponds to the data providing network element in the foregoing method, the communication device may include a processor 902, a transceiver 903, and a memory 904. The memory 904 is configured to store instructions. The processor 902 is configured to execute the instructions stored in the memory 904, to implement the related solution of the data providing network element in one or more corresponding methods shown in FIG. 1 to FIG. 8. The transceiver 903 is configured to receive a first request from a data obtaining network element, where the first request is used to obtain related data of a user. The processor 902 is configured to obtain authorization information of the user, where the authorization information includes first indication information, the first indication information indicates whether the related data of the user is allowed to be obtained, and the related data of the user includes data on an access network corresponding to the user and/or data on a core network corresponding to the user; send a first response to the data obtaining network element by using the transceiver 903 when the first indication information indicates that the user allows obtaining the related data of the user, where the first response includes the related data of the user.

When the communication device 901 corresponds to the data providing network element in the foregoing method, the transceiver 903 is specifically configured to send a fifth request to a data management network element, where the fifth request is used to request to obtain the authorization information of the user; and receive a fifth response from the data management network element, where the fifth response carries the authorization information of the user.

When the communication device 901 corresponds to the data providing network element in the foregoing method, the processor 902 is further configured to obtain updated authorization information of the user; and provide related data of the user based on the updated authorization information of the user.

When the communication device 901 corresponds to the data providing network element in the foregoing method, the processor 902 is further configured to obtain the updated authorization information of the user through subscription.

When the communication device 901 corresponds to the terminal device in the foregoing method, the communication device may include a processor 902, a transceiver 903, and a memory 904. The memory 904 is configured to store instructions. The processor 902 is configured to execute the instructions stored in the memory 904, to implement the related solution of the terminal device in one or more corresponding methods shown in FIG. 1 to FIG. 8. The processor 902 is configured to obtain authorization information of a user, where the authorization information includes first indication information, the first indication information indicates whether related data of the user is allowed to be obtained, and the related data of the user includes data on an access network corresponding to the user and/or data on a core network corresponding to the user. The transceiver 903 is configured to send the authorization information of the user to a core network element.

When the communication device 901 corresponds to the terminal device in the foregoing method, the transceiver 903 is specifically configured to receive a fourth request sent by the core network element, where the fourth request is used to request the authorization information of the user; and send a fourth response to the core network element, where the fourth response includes the authorization information of the user.

When the communication device 901 corresponds to the terminal device in the foregoing method, the transceiver 903 is further configured to send a registration request to the core network element.

For concepts, explanations, detailed descriptions, and other steps of the communication device that are related to the technical solutions provided in the embodiments of this application, refer to the descriptions of the content in the foregoing methods or other embodiments. Details are not described herein again.

Figure 10:
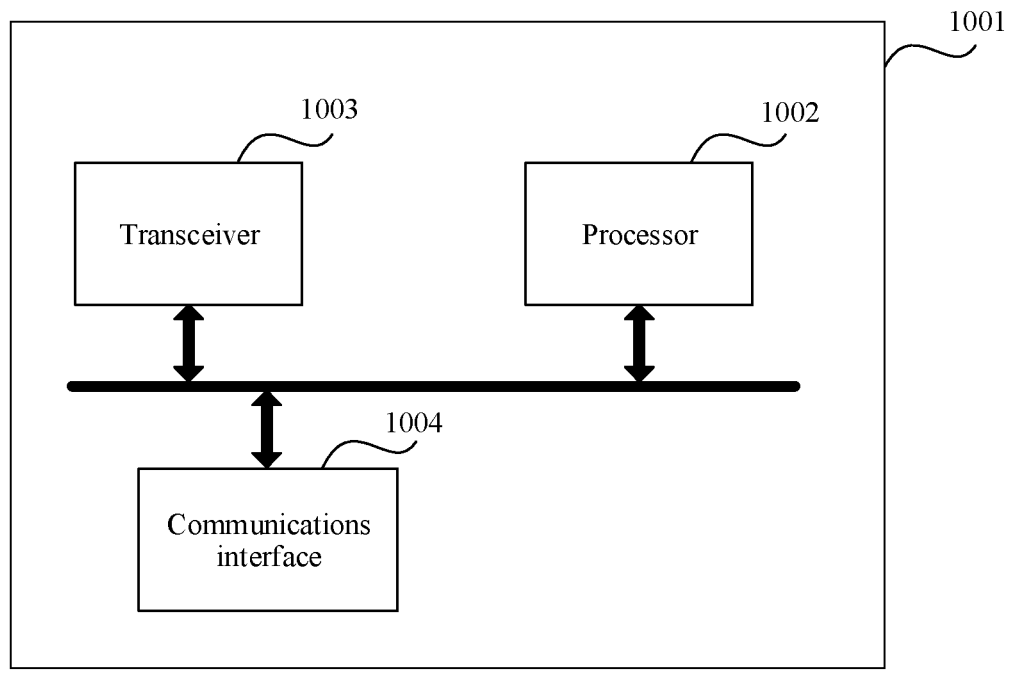
FIG. 10 is a schematic diagram of a structure of another communication device according to an embodiment of this application.

According to the foregoing method, FIG. 10 is a schematic diagram of a structure of a communication device according to an embodiment of this application. As shown in FIG. 10, the communication device 1001 may include a communications interface 1004, a processor 1002, and a transceiver 1003. The communications interface 1004 is configured to input and/or output information. The processor 1002 is configured to execute a computer program or an instruction, so that the communication device 1001 implements the method on a terminal device side in the related solutions in FIG. 1 to FIG. 8, or so that the communication device 1001 implements the method on a network device side in the related solutions in FIG. 1 to FIG. 8. The network device side may be, for example, any one or more of the data obtaining network element, the data management network element, the core network element, and the data providing network element. In this embodiment of this application, the transceiver 1003 may implement the solution implemented by the transceiver 903 in FIG. 9, and the processor 1002 may implement the solution implemented by the processor 902 in FIG. 9. Details are not described herein again.

According to the method provided in the embodiments of this application, an embodiment of this application further provides a communication system, including the foregoing network device and one or more terminal devices. The network device may be, for example, any one or more of the data obtaining network element, the data management network element, the core network element, and the data providing network element.

Figure 11:
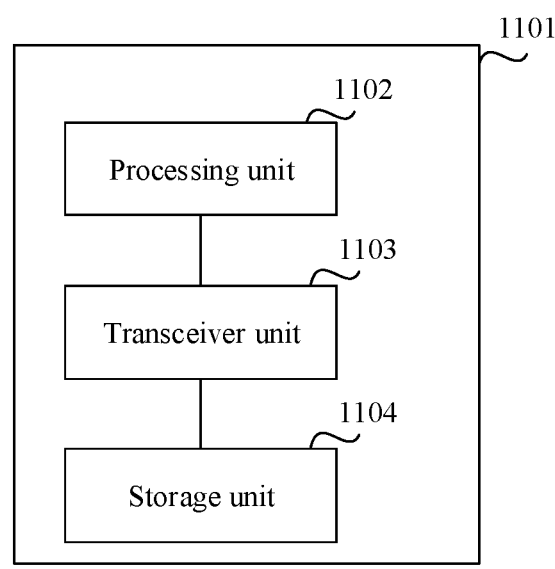
FIG. 11 is a schematic diagram of a structure of another communication device according to an embodiment of this application.

Based on the foregoing embodiments and a same concept, FIG. 11 is a schematic diagram of a communication device according to an embodiment of this application. As shown in FIG. 11, the communication device 1101 may be a terminal device or a network device, or may be a chip or a circuit, such as a chip or a circuit that can be disposed in the terminal device or the network device.

When the communication device 1101 corresponds to the data obtaining network element in the foregoing method, the communication device may include a processing unit 1102, a transceiver unit 1103, and a storage unit 1104. The storage unit 1104 is configured to store instructions. The processing unit 1102 is configured to execute the instructions stored in the storage unit 1104, to implement the related solution of the data obtaining network element in one or more corresponding methods shown in FIG. 1 to FIG. 8. The processing unit 1102 is configured to obtain authorization information of a user, where the authorization information includes first indication information, the first indication information indicates whether related data of the user is allowed to be obtained, and the related data of the user includes data on an access network corresponding to the user and/or data on a core network corresponding to the user; and send a first request to a data providing network element by using the transceiver unit 1103 when the first indication information indicates that the user allows obtaining the related data of the user, where the first request is used to obtain the related data of the user. The transceiver unit 1103 is configured to receive a first response from the data providing network element, where the first response includes the related data of the user.

When the communication device 1101 corresponds to the data management network element in the foregoing method, the communication device may include a processing unit 1102, a transceiver unit 1103, and a storage unit 1104. The storage unit 1104 is configured to store instructions. The processing unit 1102 is configured to execute the instructions stored in the storage unit 1104, to implement the related solution of the data management network element in one or more corresponding methods shown in FIG. 1 to FIG. 8. The transceiver unit 1103 is configured to receive a second request sent by a data obtaining network element, where the second request is used to request to obtain authorization information of a user; and send a second response to the data obtaining network element, where the second response includes the authorization information of the user. The processing unit 1102 is configured to determine the authorization information of the user, where the authorization information includes first indication information, the first indication information indicates whether the related data of the user is allowed to be obtained, and the related data of the user includes data on an access network corresponding to the user and/or data on a core network corresponding to the user.

When the communication device 1101 corresponds to the core network element in the foregoing method, the communication device may include a processing unit 1102, a transceiver unit 1103, and a storage unit 1104. The storage unit 1104 is configured to store instructions. The processing unit 1102 is configured to execute the instructions stored in the storage unit 1104, to implement the related solution of the core network element in one or more corresponding methods shown in FIG. 1 to FIG. 8. The transceiver unit 1103 is configured to receive authorization information of a user sent by a terminal device, where the authorization information includes first indication information, the first indication information indicates whether related data of the user is allowed to be obtained, and the related data of the user includes data on an access network corresponding to the user and/or data on a core network corresponding to the user; and send the authorization information of the user to a data management network element.

When the communication device 1101 corresponds to the data providing network element in the foregoing method, the communication device may include a processing unit 1102, a transceiver unit 1103, and a storage unit 1104. The storage unit 1104 is configured to store instructions. The processing unit 1102 is configured to execute the instructions stored in the storage unit 1104, to implement the related solution of the data providing network element in one or more corresponding methods shown in FIG. 1 to FIG. 8. The transceiver unit 1103 is configured to receive a first request from a data obtaining network element, where the first request is used to obtain related data of a user. The processing unit 1102 is configured to obtain authorization information of the user, where the authorization information includes first indication information, the first indication information indicates whether the related data of the user is allowed to be obtained, and the related data of the user includes data on an access network corresponding to the user and/or data on a core network corresponding to the user; and send a first response to the data obtaining network element by using the transceiver unit 1103 when the first indication information indicates that the user allows obtaining the related data of the user, where the first response includes the related data of the user.

When the communication device 1101 corresponds to the terminal device in the foregoing method, the communication device may include a processing unit 1102, a transceiver unit 1103, and a storage unit 1104. The storage unit 1104 is configured to store instructions. The processing unit 1102 is configured to execute the instructions stored in the storage unit 1104, to implement the related solution of the terminal device in one or more corresponding methods shown in FIG. 1 to FIG. 8. The processing unit 1102 is configured to obtain authorization information of a user, where the authorization information includes first indication information, the first indication information indicates whether related data of the user is allowed to be obtained, and the related data of the user includes data on an access network corresponding to the user and/or data on a core network corresponding to the user. The transceiver unit 1103 is configured to send the authorization information of the user to a core network element.

For concepts, explanations, detailed descriptions, and other steps of the communication device that are related to the technical solutions provided in the embodiments of this application, refer to the descriptions of the content in the foregoing methods or other embodiments. Details are not described herein again.

It may be understood that for functions of the units in the communication device 1101, refer to implementation of a corresponding method embodiment. Details are not described herein again.

It should be understood that division into the foregoing units of the communication device is merely logical function division. In actual implementation, all or some of the units may be integrated into one physical entity, or may be physically separated. In this embodiment of this application, the transceiver unit 1103 may be implemented by the transceiver 903 in FIG. 9, and the processing unit 1102 may be implemented by the processor 902 in FIG. 9.

According to the method provided in the embodiments of this application, this application further provides a computer program product. The computer program product includes computer program code. When the computer program code is run on a computer, the computer is enabled to perform the method in any one of the embodiments shown in FIG. 1 to FIG. 8.

According to the method provided in the embodiments of this application, this application further provides a computer-readable storage medium. The computer-readable medium stores program code. When the program code is run on a computer, the computer is enabled to perform the method in any one of the embodiments shown in FIG. 1 to FIG. 8.

According to the methods provided in the embodiments of this application, this application further provides a system. The system includes the foregoing one or more terminal devices and the foregoing one or more network devices.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or the functions according to the embodiments of this application are generated. The computer may be a general-purpose computer, a special-purpose computer, a computer network, or another programmable device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid-state drive, SSD)), or the like.

The network device and the terminal device in the foregoing device embodiments correspond to the network device or the terminal device in the method embodiments. A corresponding module or unit performs a corresponding step. For example, a communication unit (a transceiver) performs a receiving step or a sending step in the method embodiments, and a step other than the sending step and the receiving step may be performed by a processing unit (a processor). For a function of a specific unit, refer to a corresponding method embodiment. There may be one or more processors.

The terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. For example, the components may perform communication by using a local and/or remote process and according to, for example, a signal having one or more data packets (for example, data from two components interacting with another component in a local system, a distributed system, and/or across a network such as the internet interacting with other systems by using the signal).

A person of ordinary skill in the art may be aware that, various illustrative logical blocks (illustrative logical blocks) and steps (steps) that are described with reference to the embodiments disclosed in this specification may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, device, and unit, refer to a corresponding process in the foregoing method embodiments, and details are not described herein again.

In the several embodiments provided in this application, it should be understood that, the disclosed system, device, and method may be implemented in other manners. For example, the described device embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, the functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A communication method, comprising:
transmitting, by a network data analytics function network element, a subscription message to a data man- agement network element to subscribe to receive an automatic update of authorization information of a user;

obtaining, by the network data analytics function network element, the authorization information of the user from the data management network element, wherein the authorization information is in subscription information stored in the data management network element, the authorization information comprises first indication information, the first indication information indicates whether related data of the user is allowed to be obtained, the related data of the user comprises at least one of data on an access network corresponding to the user or data on a core network corresponding to the user, and the authorization information further comprises second indication information, and the second indication information indicates a first type of data in the related data of the user is allowed to be used and a second type of data in the related data of the user is not allowed to be used;

in response to determining that the first indication information indicates that the user allows obtaining the related data of the user, sending, by the network data analytics function network element, a first request to a network function network element separate from a terminal device corresponding to the user, wherein the first request requests to obtain the related data of the user, and in response to determining that the first indication information indicates that the user allows obtaining the related data of the user, receiving, by the network data analytics function network element, a first response from the network function network element, wherein the first response comprises the related data of the user.

2. The method according to claim 1, wherein the related data of the user further comprises at least one of data on an application server corresponding to the user or data on the terminal device corresponding to the user.

3. The method according to claim 1, wherein the authorization information further comprises a limitation condition, and the limitation condition limits an applicable condition of the first indication information.

4. The method according to claim 3, wherein the limitation condition comprises any one or more of the following content:

time information, location information, a service type, data network name (DNN) information, a service identifier, a data type, or network slice information.

5. The method according to claim 1, wherein the obtaining, by the network data analytics function network element, the authorization information of the user comprises:

sending, by the network data analytics function network element, a second request to the data management network element, wherein the second request requests to obtain the authorization information of the user; and receiving, by the network data analytics function network element, a second response from the data management network element, wherein the second response carries the authorization information of the user.

6. The method according to claim 5, wherein the second request further comprises a filter condition, and the second request requests to obtain authorization information of the user that meets the filter condition.

7. The method according to claim 1, wherein after the receiving, by the network data analytics function network element, the first response from the network function network element, the method further comprises:

determining, by the network data analytics function network element, a data analysis result based on the related data of the user; and feeding back, by the network data analytics function network element, the data analysis result to any one or more of the following objects:

an access network element, a core network element, an application server, a network management network element, or a terminal device.

8. The method according to claim 1, wherein the first request comprises identifier of the user and the first indication information.

9. A communication device, comprising:

at least one processor; and one or more memories including computer-executable instructions that, when executed by the at least one processor, cause the communication device to:

transmit a subscription message to a data management network element to subscribe to receive an automatic update of authorization information of a user;

obtain the authorization information of the user from the data management network element, wherein the authorization information is in subscription information stored in the data management network element, the authorization information comprises first indication information, the first indication information indicates whether related data of the user is allowed to be obtained, the related data of the user comprises at least one of data on an access network corresponding to the user or data on a core network corresponding to the user, and the authorization information further comprises second indication information, and the second indication information indicates a first type of data in the related data of the user is allowed to be used and a second type of data in the related data of the user is not allowed to be used;

in response to determining that the first indication information indicates that the user allows obtaining the related data of the user, send a first request to a network function network element separate from a terminal device corresponding to the user, wherein the first request requests to obtain the related data of the user; and in response to determining that the first indication information indicates that the user allows obtaining the related data of the user, receive a first response from the network function network element, wherein the first response comprises the related data of the user.

10. The communication device according to claim 9, wherein the related data of the user further comprises at least one of data on an application server corresponding to the user or data on the terminal device corresponding to the user.

11. The communication device according to claim 9, wherein the authorization information further comprises a limitation condition, and the limitation condition limits an applicable condition of the first indication information.

12. The communication device according to claim 11, wherein the limitation condition comprises any one or more of the following content:

time information, location information, a service type, data network name (DNN) information, a service identifier, a data type, or network slice information.

13. The communication device according to claim 9, wherein the computer-executable instructions, when executed by the at least one processor, cause the communication device to:
- send a second request to the data management network element, wherein the second request requests to obtain the authorization information of the user; and
- receive a second response from the data management network element, wherein the second response carries the authorization information of the user.

14. The communication device according to claim 13, wherein the second request further comprises a filter condition, and the second request requests to obtain authorization information of the user that meets the filter condition.

15. The communication device according to claim 9, wherein the computer-executable instructions, when executed by the at least one processor, cause the communication device to:
- determine a data analysis result based on the related data of the user; and
- feed back the data analysis result to any one or more of the following objects:
  - an access network element, a core network element, an application server, a network management network element, or a terminal device.

16. The communication device according to claim 9, wherein the first request comprises identifier of the user and the first indication information.

17. A communication system, comprising a network data analytics function network element and a network function network element, wherein the network data analytics function network element comprises comprising:
- at least one processor, and
- one or more memories including computer-executable instructions that, when executed by the at least one processor, cause the network data analytics function network element to:
  - transmit a subscription message to a data management network element to subscribe to receive an automatic update of authorization information of a user;
  - obtain authorization information of the user from the data management network element, wherein the authorization information is in subscription information stored in the data management network element, the authorization information comprises first indication information, the first indication information indicates whether related data of the user is allowed to be obtained, the related data of the user comprises at least one of data on an access network corresponding to the user or data on a core network corresponding to the user, and the authorization information further comprises second indication information, and the second indication information indicates a first type of data in the related data of the user is allowed to be used and a second type of data in the related data of the user is not allowed to be used;
  - in response to determining that the first indication information indicates that the user allows obtaining the related data of the user, send a first request to the network function network element separate from a terminal device corresponding to the user, wherein the first request requests to obtain the related data of the user; and
  - in response to determining that the first indication information indicates that the user allows obtaining the related data of the user, receive a first response from the network function network element, wherein the first response comprises the related data of the user.

18. The communication system according to claim 17, wherein the related data of the user further comprises at least one of data on an application server corresponding to the user or data on the terminal device corresponding to the user.

19. The communication system according to claim 17, wherein the authorization information further comprises a limitation condition, and the limitation condition limits an applicable condition of the first indication information.

20. The communication system according to claim 19, wherein the limitation condition comprises one or more of the following content:
- time information, location information, a service type, data network name (DNN) information, a service identifier, a data type, or network slice information.

* * * * *